US011889512B2

(12) United States Patent
Shah et al.

(10) Patent No.: US 11,889,512 B2
(45) Date of Patent: Jan. 30, 2024

(54) USER EQUIPMENT AND BASE STATION INVOLVED IN IMPROVED DISCONTINUED RECEPTION FOR UNLICENSED CELLS

(71) Applicant: Panasonic Intellectual Property Corporation of America, Torrance, CA (US)

(72) Inventors: Rikin Shah, Langen (DE); Ming-Hung Tao, Frankfurt am Main (DE); Hidetoshi Suzuki, Kanagawa (JP); Ankit Bhamri, Frankfurt (DE); Quan Kuang, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 563 days.

(21) Appl. No.: 17/131,304

(22) Filed: Dec. 22, 2020

(65) Prior Publication Data

US 2021/0112536 A1    Apr. 15, 2021

Related U.S. Application Data

(63) Continuation of application No. PCT/EP2019/071028, filed on Aug. 5, 2019.

(30) Foreign Application Priority Data

Aug. 9, 2018   (EP) .................................... 18188260

(51) Int. Cl.
*H04W 72/23*       (2023.01)
*H04W 76/28*       (2018.01)
(Continued)

(52) U.S. Cl.
CPC ........... *H04W 72/23* (2023.01); *H04L 5/0048* (2013.01); *H04W 74/0808* (2013.01); *H04W 76/28* (2018.02)

(58) Field of Classification Search
CPC . H04W 72/23; H04W 74/0808; H04W 76/28; H04W 52/0216; H04W 52/0229; H04L 5/0048; Y02D 30/70
See application file for complete search history.

(56) References Cited

U.S. PATENT DOCUMENTS

2016/0007374 A1\* 1/2016 Lee ..................... H04L 1/0072
                                                              370/336
2017/0265248 A1\* 9/2017 Narasimha ........ H04W 52/0216
(Continued)

FOREIGN PATENT DOCUMENTS

EP        2 621 242 A1    7/2013
EP        3 079 436 A1   10/2016
(Continued)

OTHER PUBLICATIONS

3GPP TR 36.889 V13.0.0, "$3^{rd}$ Generation Partnership Project; Technical Specification Group Radio Access Network; Study on Licensed-Assisted Access to Unlicensed Spectrum; (Release 13)," Jun. 2015, 87 pages.
(Continued)

*Primary Examiner* — Chi H Pham
*Assistant Examiner* — Vladislav Y Agureyev
(74) *Attorney, Agent, or Firm* — Seed IP Law Group LLP

(57) ABSTRACT

The present disclosure relates to a user equipment (UE) which monitors, during a first time period, a downlink channel of an unlicensed radio cell for a channel occupancy signal transmitted by a base station via the unlicensed radio cell. The channel occupancy signal indicates that the base station occupies the downlink channel. The UE receives the channel occupancy signal during the first time period from the base station and determines that the base station occupies the downlink channel based on the received channel occupancy signal. After determining that the base station occupies the downlink channel, the UE monitors, during a second
(Continued)

time period, the downlink channel for downlink control information regarding a downlink transmission to be received by the user equipment. The UE receives the downlink control information during the second time period and receives subsequently the downlink transmission from the base station based on the received downlink control information.

12 Claims, 13 Drawing Sheets

(51) Int. Cl.
  *H04L 5/00* (2006.01)
  *H04W 74/08* (2009.01)

(56) References Cited

U.S. PATENT DOCUMENTS

| | | | |
|---|---|---|---|
| 2017/0359850 A1* | 12/2017 | Loehr | H04W 76/28 |
| 2019/0261333 A1* | 8/2019 | Dinan | H04L 5/0091 |
| 2020/0170038 A1* | 5/2020 | Park | H04J 11/0053 |
| 2021/0105789 A1* | 4/2021 | Freda | H04W 72/543 |
| 2021/0368541 A1* | 11/2021 | Hedayat | H04W 52/34 |

FOREIGN PATENT DOCUMENTS

| | | | | |
|---|---|---|---|---|
| EP | 3079436 A1 * | 10/2016 | | H04W 72/042 |
| EP | 3513605 B1 * | 7/2022 | | H04B 7/2643 |
| JP | 2018511197 A | 4/2018 | | |
| WO | 2016/072787 A1 | 5/2016 | | |
| WO | WO-2016072778 A1 * | 5/2016 | | H04J 11/00 |
| WO | 2016/164202 A1 | 10/2016 | | |

OTHER PUBLICATIONS

3GPP TR 38.801 V14.0.0, "3$^{rd}$ Generation Partnership Project; Technical Specification Group Radio Access Network; Study on new radio access technology: Radio access architecture and interfaces (Release 14)," Mar. 2017, 91 pages.
3GPP TR 38.804 V14.0.0, "3$^{rd}$ Generation Partnership Project; Technical Specification Group Radio Access Network; Study on New Radio Access Technology; Radio Interface Protocol Aspects (Release 14)," Mar. 2017, 57 pages.
3GPP TR 38.913 V15.0.0, "3$^{rd}$ Generation Partnership Project; Technical Specification Group Radio Access Network; Study on Scenarios and Requirements for Next Generation Access Technologies; (Release 15)," Jun. 2018, 39 pages.
3GPP TS 36.321 V15.2.0, "3$^{rd}$ Generation Partnership Project; Technical Specification Group Radio Access Network; Evolved Universal Terrestrial Radio Access (E-UTRA); Medium Access Control (MAC) protocol specification (Release 15)," Jul. 2018, 126 pages.
3GPP TS 38.211 V15.2.0, "3$^{rd}$ Generation Partnership Project; Technical Specification Group Radio Access Network; NR; Physical channels and modulation (Release 15)," Jun. 2018, 96 pages.
3GPP TS 38.212 V15.2.0, "3$^{rd}$ Generation Partnership Project; Technical Specification Group Radio Access Network; NR; Multiplexing and channel coding (Release 15)," Jun. 2018, 98 pages.
3GPP TS 38.213 V15.2.0, "3rd Generation Partnership Project; Technical Specification Group Radio Access Network; NR; Physical layer procedures for control (Release 15)," Jun. 2018, 99 pages.
3GPP TS 38.300 V15.2.0, "3$^{rd}$ Generation Partnership Project; Technical Specification Group Radio Access Network; NR; NR and NG-RAN Overall Description; Stage 2 (Release 15)," Jun. 2018, 87 pages.
3GPP TS 38.321 V15.2.0, "3$^{rd}$ Generation Partnership Project; Technical Specification Group Radio Access Network; NR; Medium Access Control (MAC) protocol specification (Release 15)," Jun. 2018, 73 pages.
3GPP TS 38.331 V15.2.1, "3$^{rd}$ Generation Partnership Project; Technical Specification Group Radio Access Network; NR; Radio Resource Control (RRC) protocol specification (Release 15)," Jun. 2018, 303 pages.
ETSI, "Broadband Radio Access Networks (BRAN); 5 GHz high performance RLAN; Harmonized EN covering the essential requirements of article 3.2 of the R&TTE Directive," ETSI EN 301 893 V1.8.1, Mar. 2015, 93 pages.
InterDigital Inc., "Discontinuous reception in NR-Unlicensed," R2-1809611, Agenda Item: 11.2, 3GPP TSG-RAN WG2 NR AH1807 Meeting, Montreal, Canada, Jul. 2-6, 2018, 3 pages.
International Search Report, dated Sep. 11, 2019, for International Application No. PCT/EP2019/071028, 3 pages.
Vivo, "Potential solutions and techniques for NR unlicensed spectrum," R1-1801557, Agenda Item: 7.6.4, 3GPP TSG RAN WG1 Meeting #92, Athens, Greece, Feb. 26-Mar. 2, 2018, 6 pages.
English Translation of Japanese Office Action, dated Jun. 13, 2023, for Japanese Patent Application No. 2020-568722. (4 pages).

* cited by examiner

USER EQUIPMENT AND BASE STATION INVOLVED IN IMPROVED DISCONTINUED RECEPTION FOR UNLICENSED CELLS

BACKGROUND

Technical Field

The present disclosure is directed to methods, devices and articles in communication systems, such as 3GPP communication systems.

Description of the Related Art

Currently, the 3rd Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "Study on New Radio Access Technology" involving RAN1, RAN2, RAN3 and RAN4 was approved and is expected to become the Release 15 work item that defines the first 5G standard. The aim of the study item is to develop a "New Radio (NR)" access technology (RAT), which operates in frequency ranges up to 100 GHz and supports a broad range of use cases, as defined during the RAN requirements study (see, e.g., 3GPP TR 38.913 "Study on Scenarios and Requirements for Next Generation Access Technologies", current version 15.0 available at www.3gpp.org and incorporated herein its entirety by reference).

One objective is to provide a single technical framework addressing all usage scenarios, requirements and deployment scenarios defined, e.g., in section 6 of TR 38.913, at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies.

A second objective is to achieve forward compatibility. Backward compatibility to Long Term Evolution (LTE, LTE-A) cellular systems is not required, which facilitates a completely new system design and/or the introduction of novel features.

The fundamental physical layer signal waveform will be based on OFDM, with potential support of a non-orthogonal waveform and multiple access. For instance, additional functionality on top of OFDM such as DFT-S-OFDM, and/or variants of DFT-S-OFDM, and/or filtering/windowing is further considered. In LTE, CP-based OFDM and DFT-S-OFDM are used as waveform for downlink and uplink transmission, respectively. One of the design targets in NR is to seek a common waveform as much as possible for downlink, uplink and sidelink.

Besides the waveform, some basic frame structure(s) and channel coding scheme(s) will be developed to achieve the above-mentioned objectives. The study shall also seek a common understanding on what is required in terms of radio protocol structure and architecture to achieve the above-mentioned objectives. Furthermore, the technical features which are necessary to enable the new RAT to meet the above-mentioned objectives shall be studied, including efficient multiplexing of traffic for different services and use cases on the same contiguous block of spectrum.

Existing cellular network architectures are relatively monolithic, with a transport network that facilitates mobile traffic to user devices. They may not be flexible enough to so support wider ranges of performance and scalability requirements.

Since the standardization for the NR of $5^{th}$ Generation systems of 3GPP is at the beginning, there are several issues that remain unclear, require further improvement and new solutions.

BRIEF SUMMARY

Non-limiting and exemplary embodiments facilitate providing improved procedures to optimize how and when the user equipment monitors the downlink channels of an unlicensed radio cell for downlink control information transmitted by a base station.

In one general first aspect, the techniques disclosed here feature a user equipment comprising a receiver, processor according to the following. The receiver monitors, during a first time period, a downlink channel of an unlicensed radio cell for a channel occupancy signal that is transmitted by a base station communicating with the user equipment via the unlicensed radio cell of a mobile communication system. The channel occupancy signal indicates that the base station occupies the downlink channel to perform downlink transmissions. The receiver receives the channel occupancy signal during the first time period from the base station. The processor determines that the base station occupies the downlink channel based on the received channel occupancy signal. After determining that the base station occupies the downlink channel, the receiver monitors, during a second time period, the downlink channel for downlink control information regarding a downlink transmission to be received by the user equipment. The receiver receives the downlink control information during the second time period and receives subsequently the downlink transmission from the base station based on the received downlink control information.

In one general first aspect, the techniques disclosed here feature a base station comprising a receiver and processing circuitry as well as a transmitter according to the following. The receiver and processing circuitry perform a clear channel assessment for a downlink channel of the unlicensed radio cell to determine whether the base station can occupy the downlink channel to perform downlink transmissions. The transmitter, when the base station can occupy the downlink channel, transmits a channel occupancy signal on the downlink channel of the unlicensed radio cell to the user equipment. The channel occupancy signal indicates that the base station occupies the downlink channel to perform downlink transmissions. The transmitter transmits to the user equipment downlink control information regarding a downlink transmission to be received by the user equipment. The transmitter transmits a downlink transmission to the user equipment based on the received downlink control information.

In one general first aspect, the techniques disclosed here feature a method comprising the following steps performed by a user equipment. The UE monitors, during a first time period, a downlink channel of an unlicensed radio cell for a channel occupancy signal that is transmitted by a base station communicating with the user equipment via the unlicensed radio cell of a mobile communication system. The channel occupancy signal indicates that the base station occupies the downlink channel to perform downlink transmissions. The channel occupancy signal is received during the first time period from the base station. The UE determined that the base station occupies the downlink channel based on the received channel occupancy signal. After determining that the base station occupies the downlink channel, the UE monitors, during a second time period, the downlink channel for downlink control information regarding a downlink transmission to be received by the user equipment. The UE receives the downlink control information during the second time period and receives subsequently the downlink transmission from the base station based on the received downlink control information.

In one general first aspect, the techniques disclosed here feature a method comprising the following steps performed by a base station. The base station performs a clear channel assessment for a downlink channel of the unlicensed radio cell to determine whether the base station can occupy the downlink channel to perform downlink transmissions. When the base station can occupy the downlink channel, the base station transmits a channel occupancy signal on the downlink channel of the unlicensed radio cell to the user equipment. The channel occupancy signal indicates that the base station occupies the downlink channel to perform downlink transmissions. The base station transmits to the user equipment downlink control information regarding a downlink transmission to be received by the user equipment. The base station transmits a downlink transmission to the user equipment based on the received downlink control information.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

DETAILED DESCRIPTION

Basis of the Present Disclosure

5G NR System Architecture and Protocol Stacks

As presented in the background section, 3GPP is working at the next release for the 5$^{th}$ generation cellular technology, simply called 5G, including the development of a new radio access technology (NR) operating in frequencies ranging up to 100 GHz. 3GPP has to identify and develop the technology components needed for successfully standardizing the NR system timely satisfying both the urgent market needs and the more long-term requirements. In order to achieve this, evolutions of the radio interface as well as radio network architecture are considered in the study item "New Radio Access Technology". Results and agreements are collected in the Technical Report TR 38.804 v14.0.0, incorporated herein in its entirety by reference.

Figure 1:
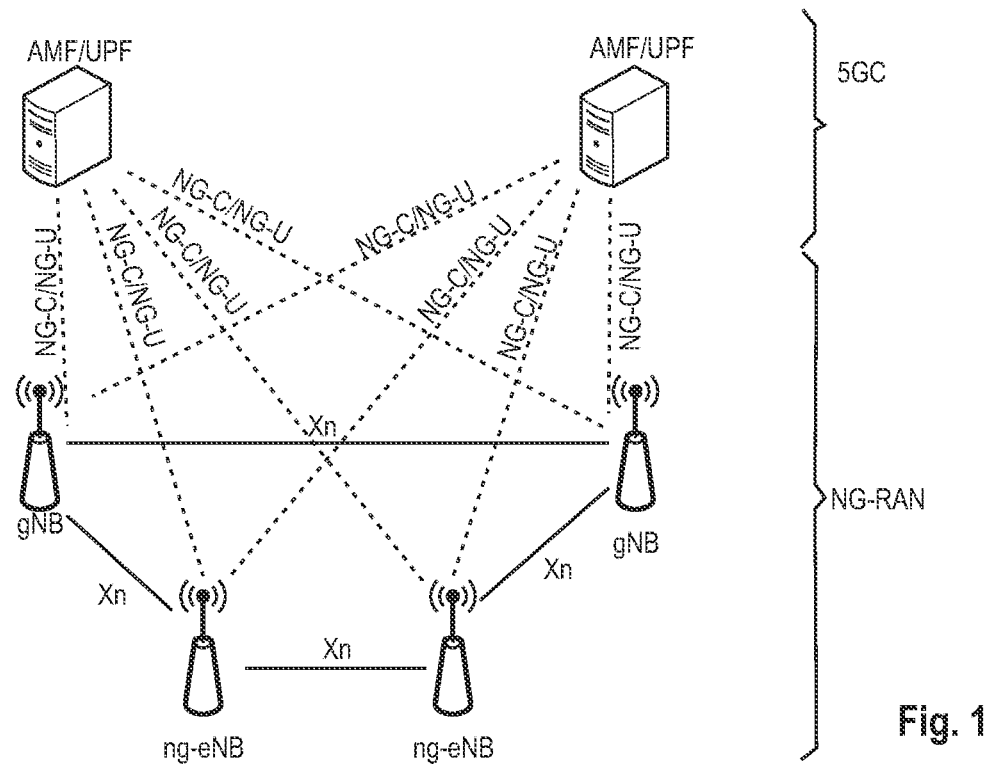
FIG. 1 shows an exemplary architecture for a 3GPP NR system.

Among other things, there has been a provisional agreement on the overall system architecture. The NG-RAN (Next Generation-Radio Access Network) consists of gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1, based on TS 38.300 v15.2.0, section 4 incorporated herein by reference.

Figure 2:
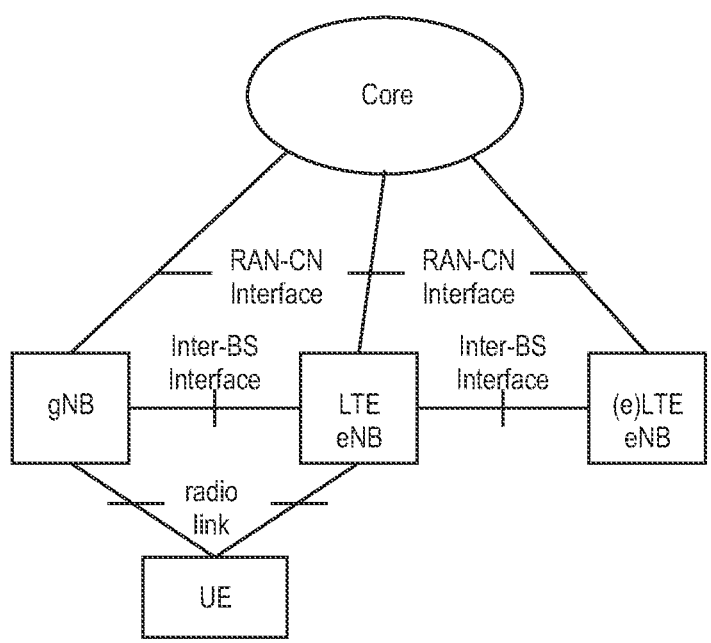
FIG. 2 shows an exemplary user and control plane architecture for the LTE eNB, gNB, and UE.

Various different deployment scenarios are currently being discussed for being supported, as reflected, e.g., in 3GPP TR 38.801 v14.0.0 incorporated herein by reference in its entirety. For instance, a non-centralized deployment scenario (section 5.2 of TR 38.801; a centralized deployment is illustrated in section 5.4) is presented therein, where base stations supporting the 5G NR can be deployed. FIG. 2 illustrates an exemplary non-centralized deployment scenario and is based on FIG. 5.2.-1 of said TR 38.801, while additionally illustrating an LTE eNB as well as a user equipment (UE) that is connected to both a gNB and an LTE eNB. The new eNB for NR 5G may be exemplarily called gNB. An eLTE eNB, as exemplarily defined in TR 38.801, is the evolution of an eNB that supports connectivity to the EPC (Evolved Packet Core) and the NGC (Next Generation Core).

The user plane protocol stack for NR is currently defined in TS 38.300 v15.2.0, section 4.4.1. The PDCP (Packet Data Convergence Protocol), RLC (Radio Link Control) and MAC (Medium Access Control) sublayers are terminated in the gNB on the network side. Additionally, a new access stratum (AS) sublayer (SDAP, Service Data Adaptation Protocol) is introduced above PDCP as described in sub-clause 6.5 of TS 38.300. The control plane protocol stack for NR is defined in TS 38.300, section 4.4.2. An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300. The mentioned sections of TS 38.300 are incorporated herein by reference.

The new NR layers exemplarily assumed for the 5G systems may be based on the user plane layer structure currently used in LTE(-A) communication systems.

As identified in TR 38.913, use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1$-$10^{-5}$ within 1 ms). Finally, mMTC requires high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may require a shorter symbol duration (and thus larger subcarrier spacing) and/or fewer symbols per scheduling interval (aka, TTI) than an mMTC service. Furthermore, deployment scenarios with large channel delay spreads require a longer CP duration than scenarios with short delay spreads. The subcarrier spacing should be optimized accordingly to retain the similar CP overhead. In 3GPP RAN1 #84bis meeting (Busan, April 2016), it was agreed that it is necessary for NR to support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain. Some definitions have already been achieved as apparent from 3GPP TS 38.211 v15.2.0 incorporated herein by reference.

Control Signaling/PDCCH/DCI/Search Spaces

The main purpose of DCI (Downlink Control Information) in 5G NR is the same as DCI in LTE, namely being a special set of information that schedules a downlink data channel (e.g., the PDSCH) or an uplink data channel (e.g., PUSCH). In 5G NR there are a number of different DCI Formats defined already, as apparent from TS 38.212 v15.2.0 section 7.3.1 incorporated herein by reference. The following table is taken therefrom:

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

More detailed information on the different DCI formats can be obtained from the cited TS 38.212 v15.2.0.

PDCCH search spaces are areas in the downlink resource grid (time-frequency resources) where a PDCCH (DCI) may be carried. The UE performs blind decoding throughout these search spaces trying to find PDCCH data (i.e., DCI). At high level, the Search Space concept in 5G NR is similar to LTE Search Space, but there are many differences in terms of the details.

In order for the UE to decode a PDCCH (DCI), it figures out, e.g., the exact value for location (CCE index), structure (Aggregation Level, Interleaving, etc.) and scrambling code (RNTI), etc. But this information is typically not informed to UE beforehand and in most case those values change dynamically. The only thing known to UE is the information about a certain range that possibly carries a PDCCH(DCI). UE knows about the information about this certain range by a predefined rule or signaling message. Within this range, UE has to try to decode PDCCH/DCI using many different types of parameters (CCE Index, Aggregation Level, RNTI) based on trial and error method. This way of decoding is called "Blind Decoding". The predefined region in which UE perform the blind decoding is called a "Search Space".

There are two types of search spaces called "UE-specific search space" and "Common Search Space". UE Specific Search Space is informed to the UE, e.g., via RRC signaling message. Correspondingly, the UE performs the RRC establishment and gets the information about the UE-specific search space. However, in order to facilitate for the UE to decode some PDCCH even before UE completes RRC establishment, for example, the UE may detect PDCCH for SIB1 reception or various DCI (PDCCH) during RACH process (e.g., DCI for Msg2/Msg4 reception). For this kind of situation and others, the network (gNB) transmits a PDCCH in special region that UE can figure out by, e.g., a predefined algorithm (not via RRC signaling). This special region is called Common Search Space and thus can be acquired by any and all UEs.

The UE procedure for receiving control information using the search spaces and PDCCHs is described in TS 38.213 v15.2.0, section 10, incorporated herein by reference. As apparent therefore, there are different search space types, as exemplarily listed in the following table.

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI, TC-RNTI, C-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, CS-RNTI(s), SP-CSI-RNTI | |
| | UE Specific | C-RNTI, or CS-RNTI(s), or SP-C SI-RNTI | User specific PDSCH decoding |

RNTI, which stands for Radio Network Temporary Identifier, is an identification number and relies basically on the same concept as already known from LTE. As apparent from the above table, there are numerous different RNTIs that can be used in the 5G-NR communication system for different purposes. Different DCIs (i.e., DCIs of different formats) are typically scrambled (more specifically the CRC part of the DCI) with different RNTIs. For instance, the P-RNTI (Paging RNTI) is used for the paging message. The SI-RNTI (System Information RNTI) is used for the transmission of SIB (System Information Block messages). The SFI-RNTI (Slot-Format-Indicator-RNTI) is used in combination with the DCI Format 2_0 to inform the UE on whether the OFDM symbols in the slots are Downlink, Uplink or Flexible. The INT-RNTI (Interrupted Transmission Indication-RNTI) is used in combination with the DCI Format 2_1 to inform UEs on PRBs or OFDM symbols where the UE may assume that no transmission is intended for the UE. The C-RNTI (Cell RNTI) is typically used for transmission to a specific UE. The CS-RNTI (Configured Scheduling RNTI) is used in 5G as part of a configured scheduling resource allocation, which enables the RRC to define the periodicity of the CS grant using the CS-RNTI, so that the resource can be implicitly reused according to the periodicity defined by RRC. An overview and more information on the different RNTIs so far defined for 5G NR can be found in TS 38.321 v15.2.0, incorporated herein by reference in its entirety. Among other things, the following table is taken therefrom:

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| CS-RNTI | Configured scheduled unicast transmission (activation, reactivation and retransmission) | DL-SCH, UL-SCH | DCCH, DTCH |
| CS-RNTI | Configured scheduled unicast transmission (deactivation) | N/A | N/A |
| TPC-PUCCH-RNTI | PUCCH power control | N/A | N/A |
| TPC-PUSCH-RNTI | PUSCH power control | N/A | N/A |
| TPC-SRS-RNTI | SRS trigger and power control | N/A | N/A |
| INT-RNTI | Indication pre-emption in DL | N/A | N/A |
| SFI-RNTI | Slot Format Indication on the given cell | N/A | N/A |
| SP-CSI-RNTI | Activation of Semi-persistent CSI reporting on PUSCH | N/A | N/A |

Licensed-Assisted Access (LAA) and Enhanced LAA (eLAA)

The reason for extending LTE to unlicensed bands is the ever-growing demand for wireless broadband data in conjunction with the limited amount of licensed bands. The unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum access due to the inevitable coexistence with other radio access technologies (RATs) in the unlicensed spectrum such as Wi-Fi. LTE operation on unlicensed bands was therefore at least in the beginning considered a complement to LTE on licensed spectrum rather than as stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum, i.e., without being assisted by licensed cells, however shall not be excluded and is now foreseen for 5G NR as will be explained later.

The currently-intended general LAA approach at 3GPP is to make use of the already specified Rel-12 carrier aggregation (CA) framework as much as possible, where the CA framework configuration as explained before comprises a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

Figure 3:
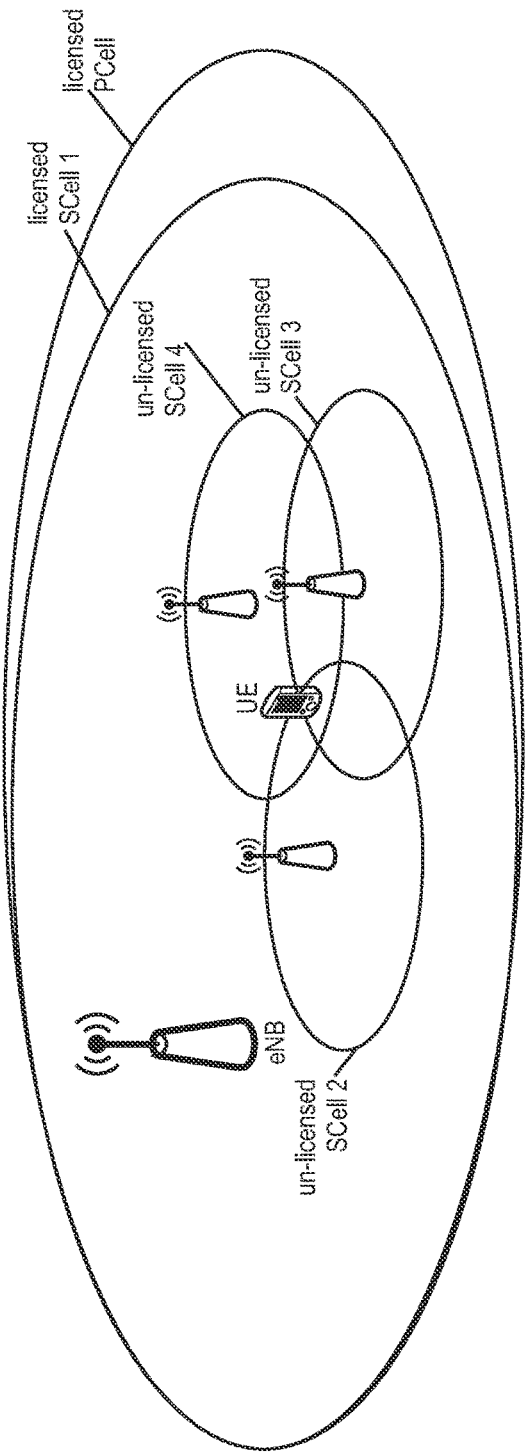
FIG. 3 illustrates an exemplary LAA scenario with several licensed and unlicensed cells.

A very basic scenario is illustrated in FIG. 3, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

At present, the basic approach envisioned at 3GPP for LTE is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while an SCell on unlicensed spectrum might yield, depending on the scenario, to some extent significant QoS reduction due to inevitable coexistence with other RATs.

It has been agreed that the LAA will focus on unlicensed bands at 5 GHz. One of the most critical issues is therefore the coexistence with Wi-Fi (IEEE 802.11) systems operating at these unlicensed bands. In order to support fair coexistence between LTE and other technologies such as Wi-Fi as well as to guarantee fairness between different LTE operators in the same unlicensed band, the channel access of LTE for unlicensed bands has to abide by certain sets of regulatory rules which partly may depend on the geographical region and particular frequency band; a comprehensive description of the regulatory requirements for all regions for operation on unlicensed bands at 5 GHz is given in the 3GPP Technical Report TR 36.889, current version 13.0.0. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration (may also be termed channel occupancy time, or channel acquisition time). The intention of 3GPP is to target a single global framework for LAA which basically means that all requirements for different regions and bands at 5 GHz have to be taken into account for the system design.

The listen-before-talk (LBT) procedure is defined as a mechanism by which an equipment applies a clear channel assessment (CCA) check before using the channel. The CCA utilizes at least energy detection to determine the presence or absence of other signals on an unlicensed channel in order to determine if a channel is occupied or clear, respectively. European and Japanese regulations for instance mandate the usage of LBT in the unlicensed bands. Apart from regulatory requirements, this carrier sensing via LBT is one way for fair sharing of the unlicensed spectrum and is thus considered to be a vital feature for fair and friendly operation in the unlicensed spectrum in a single global solution framework.

In the unlicensed spectrum, the channel availability cannot always be guaranteed. In addition, certain regions such as Europe and Japan prohibit continuous transmissions and impose limits on the maximum duration of a transmission burst in the unlicensed spectrum (maximum channel occupancy). Hence, discontinuous transmission with limited maximum transmission duration is a required functionality for LAA.

Following this European regulation regarding LBT, devices have to perform a clear channel Assessment (CCA) before occupying the radio channel with a data transmission. It is only allowed to initiate a transmission on the unlicensed channel after detecting the channel as free based, e.g., on energy detection. In particular, the equipment has to observe the channel for a certain minimum time (e.g., for Europe 20 µs, see ETSI 301 893, under clause 4.8.3) during the CCA. The channel is considered occupied if the detected energy level exceeds a configured CCA threshold (e.g., for Europe, −73 dBm/MHz, see ETSI 301 893, under clause 4.8.3), and conversely is considered to be free if the detected power level is below the configured CCA threshold. If the channel is determined as being occupied, it shall not transmit on that channel during the next Fixed Frame Period. If the channel is classified as free, the equipment is allowed to transmit immediately. The maximum transmit duration is restricted in order to facilitate fair resource sharing with other devices operating on the same band.

The CCA can be performed repeatedly, optionally with a backoff time in between.

The energy detection for the CCA can be performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

In addition to the CCA described above, it might be required to apply an additional extended CCA (ECCA) if the equipment is classified as Load Based Equipment (LBE) according to the description in ETSI 301 893, clause 4.9.2.2, incorporated herein by reference. The ECCA comprises an additional CCA observation time for the duration of a random factor N multiplied by a CCA observation time slot. N defines the number of clear idle slots resulting in a total idle period that has to be observed before initiating a transmission.

Figure 4:
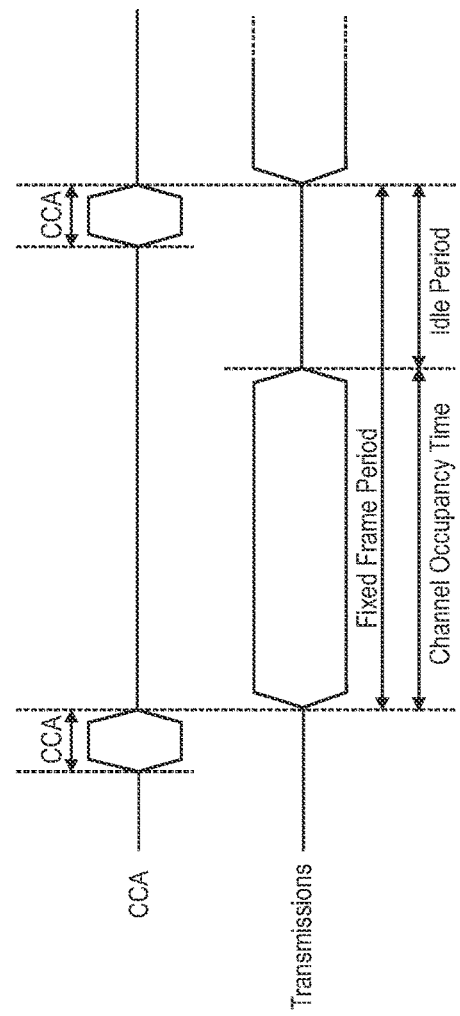
FIG. 4 illustrates the transmission behavior for an LAA transmission.

Furthermore, the total time during which an equipment has transmissions on a given carrier without re-evaluating the availability of that carrier (i.e., LBT/CCA) is defined as the channel occupancy time (see ETSI 301 893, under clause 4.8.3.1). The channel occupancy time shall be in the range of 1 ms to 10 ms, where the maximum channel occupancy time could be, e.g., 4 ms as currently defined for Europe. Furthermore, there is a minimum Idle time the UE is not allowed to transmit after a transmission on the unlicensed cell, the minimum Idle time being at least 5% of the channel occupancy time. Towards the end of the Idle Period, the UE can perform a new CCA, and so on. This transmission behavior is schematically illustrated in FIG. 4 the figure being taken from ETSI EN 301 893 (there FIG. 2: "Example of timing for Frame Based Equipment").

Figure 5:
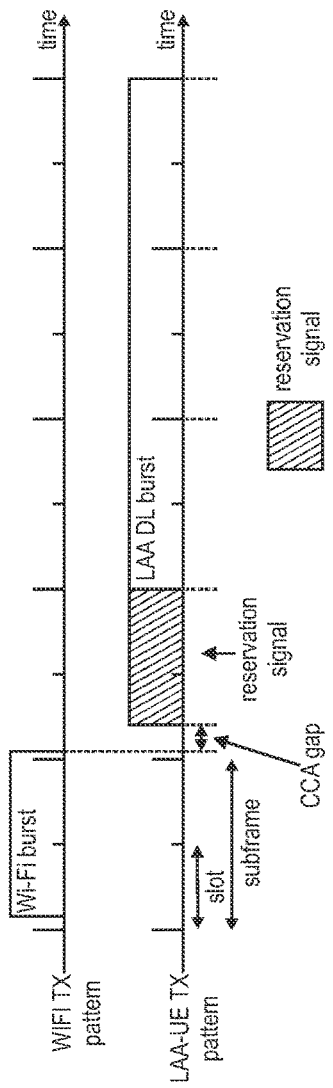
FIG. 5 illustrates the timing between a Wi-Fi transmission and LAA UE downlink burst for an unlicensed cell.

FIG. 5 illustrates the timing between a Wi-Fi transmission and LAA UE transmissions on a particular frequency band (unlicensed cell). As can be seen from FIG. 5, after the Wi-Fi burst, a CCA gap is assumed before the eNB "reserves" the unlicensed cell by, e.g., transmitting a reservation signal until the next subframe boundary. Then, the actual LAA DL burst is started. This would similarly apply to an LTE UE, which after successfully performing the CCA, would reserve the subframe by transmitting the reservation signal so as to then start the actual LAA UL burst.

As mentioned above, LAA allows downlink-only operation by eNBs to increase data rates. Enhanced licensed assisted access (eLAA) is part of the 3GPP Release 14 and additionally defines, amongst other things, how the UE can access the unlicensed band to transmit data in the uplink direction. Thus, one major difference to LAA is how to handle the uplink transmissions. Generally, all uplink transmissions in LTE are scheduled and therefore under control of the serving LTE base station (eNB). Since this affects the channel contention between devices, the required LBT (Listen Before Talk) scheme that was defined in LAA for downlink operation needs to be adapted to work in the uplink direction. It is exemplarily assumed that the Primary Cell (PCell) is always located in the licensed spectrum bands, while the Secondary cell SCell) is located in the unlicensed spectrum bands.

Usage of the unlicensed bands will also become a focus for the new 5G-NR development. It was recently decided to use the NR licensed design as the baseline and consider more deployment scenarios such as:

Carrier aggregation between the NR licensed cell (e.g., PCell) and NR unlicensed cell (e.g., SCell) similar to LTE LAA Dual Connectivity (with LTE and with NR); ENU-DC in which the master eNB operates in licensed spectrum and secondary gNB operates in unlicensed spectrum; NNU-DC in which the master NB operates in licensed spectrum and the secondary gNB operates in unlicensed spectrum Stand-Alone (SA): NR-U SA, in which a standalone NR PCell operates in the unlicensed spectrum An NR radio cell with Downlink in unlicensed band and UL in licensed band In NR, Listen-Before-Talk, is to be performed on unlicensed carriers. In particular, transmitting entities perform LBT, and channel occupation is allowed after a successful Clear Channel Assessment (CCA).

The above-mentioned stand-alone scenario is especially challenging because the network (gNB) does not have the possibility to rely on a licensed carrier (such as the licensed PCell carrier in LTE) to communicate with the UE. The only channel to the UE is the unlicensed channel for which successful LBT is required to access same.

Synchronization Signal Block Measurement Timing Configuration—SMTC-PSS/SSS, PBCH NR has introduced the so-called synchronization signal block, SS block (SSB), which comprises a Primary Synchronization Signal (PSS), a Secondary Synchronization Signal (SSS), and a Physical Broadcast CHannel (PBCH). In LTE, these three signals were also used, the PSS, SSS, and PBCH, although not as being part of one SSB. The three SSB components are always transmitted together in NR, e.g., they have the same periodicity. A given SSB may be repeated within an SS burst set, which can be potentially used for a gNB beam-sweeping transmission. The SS burst set may be confined to a particular time period, such as a 5 ms window. For initial cell selection, the UE may assume a default SS burst set periodicity of 20 ms.

One or multiple SSBs compose an SS burst set. The SS burst set composition including the maximum number of SSBs within an SS burst set, SSB mapping pattern, and SS burst set mapping to slots in a radio frame can be dependent on the carrier frequency. Regardless of the SS burst set composition, the transmission of SSBs within an SS burst set is confined to a 5 ms window to help UEs reduce power consumption and complexity for radio resource management (RRM) measurements. The maximum number of SSBs within an SS burst set is, e.g., 4 for particular frequency ranges, e.g., up to 4 GHz, or 8 for 3-6 GHz, or 64 for 5-52.6 GHz. Furthermore, the number of actual transmitted SSBs could be less than the maximum number.

The position(s) of actual transmitted SSBs can be reported to the UEs. Different SSB mapping patterns can, e.g., be provided, where several symbols are preserved for DL control at the beginning of the slot and several symbols are preserved for guard period and uplink control to allow for UL/DL switching.

Within a broadcast channel (BCH) transmission time interval (TTI) update period of 80 ms, there are 16 possible positions of an SS burst set, if the minimum period for an SS burst of 5 ms is considered. The 16 possible positions of an SS burst set could be identified by the 3 least significant bits (LSB) of the System Frame Number (SFN) and 1-bit half radio frame index. It is known that SSBs are repeated within an SS burst set. When the UE detects an SSB, it will acquire the timing information from its PBCH, from which the UE is able to identify the radio frame number, the slot index in a radio frame, and the OFDM symbol index in a slot.

Some definitions are already provided in 3GPP technical standard TS 38.331, e.g., in section 6.3.2 defining an SSB-MTC information element used to configure measurement timing configurations, i.e., timing occasions at which the UE measures SSBs.

The IE SSB-MTC is used to configure measurement timing configurations, i.e., timing occasions at which the UE measures SSBs. SMTC (SMTC1) is referring to the current cell, while SMTC2 is referring to the neighbouring cell.

| SSB-MTC information element |
| --- |
| SSB-MTC ::=  SEQUENCE { |
| periodicityAndOffset  CHOICE { |
| sf5  INTEGER (0..4), |
| sf10  INTEGER (0..9), |
| sf20  INTEGER (0..19), |
| sf40  INTEGER (0..39), |
| sf80  INTEGER (0..79), |
| sf160  INTEGER (0..159) |
| }, |

| SSB-MTC information element |
| --- |
| duration ENUMERATED { sf1, sf2, sf3, sf4, sf5 }<br>}<br>SSB-MTC2 ::=    SEQUENCE {<br>pci-List    SEQUENCE (SIZE<br> (1..maxNrofPCIsPerSMTC)) OF PhysCellId    OPTIONAL, -- Need M<br>periodicity    NUMERATED {sf5, sf10, sf20, sf40,<br>sf80, spare3, spare2, spare1}<br>} |

| SSB-MTC field descriptions |
| --- |
| duration<br>Duration of the measurement window in which to receive SS/PBCH blocks. It is given in<br>number of subframes (see 38.213, section 4.1)<br>periodicityAndOffset<br>Periodicity and offset of the measurement window in which to receive SS/PBCH blocks.<br>Periodicity and offset are given in number of subframes. FFS_FIXME: This does not match<br>the L1 parameter table! They seem to intend an index to a hidden table in L1 specs. (see<br>38.213, section REF): Periodicity for the given PCIs. Timing offset and Duration as<br>provided in smtc1.<br>SSB-MTC2 field descriptions<br><br>pci-List<br>PCIs that are known to follow this SMTC. |

Discontinued Reception, DRX, in LTE

Battery saving is an important issue in mobile communication. To reduce the battery consumption in the UE, a mechanism to minimize the time the UE spends monitoring the PDCCH is used, which is called the Discontinuous Reception (DRX) functionality.

DRX functionality can be configured for RRC_IDLE, in which case the UE uses either the specific or default DRX value (defaultPagingCycle); the default is broadcasted in the System Information and can have values of 32, 64, 128 and 256 radio frames. If both specific and default values are available, the shorter value of the two is chosen by the UE. The UE needs to wake up for one paging occasion per DRX cycle, the paging occasion being one subframe. DRX functionality can be also configured for an "RRC_CONNECTED" UE, so that it does not always need to monitor the downlink channels for downlink control information (or phrased simply: the UE monitors the PDCCH). In order to provide reasonable battery consumption of a user equipment, 3GPP LTE (Release 8/9) as well as 3GPP LTE-A (Release 10) introduced a concept of discontinuous reception (DRX). Technical Standard TS 36.321, current version 15.2.0, chapter 5.7 explains the DRX and is incorporated by reference herein.

The following parameters are available to define the DRX UE behavior; i.e., the On-Duration periods at which the mobile node is active (i.e., in DRX Active Time), and the periods where the mobile node is in DRX (i.e., not in DRX Active Time).

- On-duration: duration in downlink subframes, i.e., more in particular in subframes with PDCCH (also referred to as PDCCH subframe), that the user equipment, after waking up from DRX, receives and monitors the PDCCH. It should be noted here that throughout this disclosure the term "PDCCH" refers to the PDCCH, EPDCCH (in subframes when configured) or, for a relay node with R-PDCCH configured and not suspended, to the R-PDCCH. If the user equipment successfully decodes a PDCCH, the user equipment stays awake/active and starts the inactivity timer; [1-200 subframes; 16 steps: 1-6, 10-60, 80, 100, 200]
- DRX inactivity timer: duration in downlink subframes that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (i.e., not for retransmissions). [1-2560 subframes; 22 steps, 10 spares: 1-6, 8, 10-60, 80, 100-300, 500, 750, 1280, 1920, 2560]
- DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]
- DRX short cycle: specifies the periodic repetition of the on-duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]
- DRX short cycle timer: specifies the number of consecutive subframes the UE follows the short DRX cycle after the DRX Inactivity Timer has expired. This parameter is optional. [1-16 subframes]
- Long DRX Cycle Start offset: specifies the periodic repetition of the on-duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0-subframe length of chosen cycle]]

The total duration that the UE is awake is called "Active time" or DRX Active Time. The Active Time, e.g., includes the on-duration of the DRX cycle, the time UE is performing continuous reception while the inactivity timer has not expired and the time UE is performing continuous reception while waiting for a downlink retransmission after one HARQ RTT. Similarly, for the uplink the UE is awake (i.e., in DRX Active Time) at subframes where uplink retransmission grants can be received, i.e., every 8 ms after an initial uplink transmission until the maximum number of retransmissions is reached. Based on the above, the minimum Active Time is of fixed length equal to on-duration, and the maximum is variable depending on, e.g., the PDCCH activity.

The "DRX period" or "DRX off period" is the duration of downlink subframes during which a UE can skip reception of downlink channels for battery saving purposes, i.e., is not required to monitor the downlink channels. The operation of DRX gives the mobile terminal the opportunity to deactivate the radio circuits repeatedly (according to the currently active DRX cycle) in order to save power. Whether the UE indeed remains in DRX (i.e., is not active) during the DRX period may be decided by the UE; for example, the UE usually performs inter-frequency measurements which cannot be conducted during the On-Duration, and thus need to be performed at some other time, e.g., during the DRX off time.

The parameterization of the DRX cycle involves a trade-off between battery saving and latency. For example, in case of a web browsing service, it is usually a waste of resources for a UE to continuously receive downlink channels while the user is reading a downloaded web page. On the one hand, a long DRX period is beneficial for lengthening the UE's battery life. On the other hand, a short DRX period is better for faster response when data transfer is resumed—for example when a user requests another web page.

To meet these conflicting requirements, two DRX cycles—a short cycle and a long cycle—can be configured for each UE; the short DRX cycle is optional, i.e., only the long DRX cycle could be used. The transition between the short DRX cycle, the long DRX cycle and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next on-duration time, and the UE then resumes continuous reception. On the other hand, if no data arrives at the eNodeB during the short DRX cycle, the UE enters the long DRX cycle, assuming that the packet activity is finished for the time being.

During the Active Time, the UE monitors the PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to the On-Duration subframes.

Available DRX values are controlled by the network and start from non-DRX up to x seconds. Value x may be as long as the paging DRX used in RRC_IDLE. Measurement requirements and reporting criteria can differ according to the length of the DRX interval, i.e., long DRX intervals may have more relaxed requirements (for more details see further below). When DRX is configured, periodic CQI reports can only be sent by the UE during "active-time". RRC can further restrict periodic CQI reports so that they are only sent during the on-duration.

Figure 6:
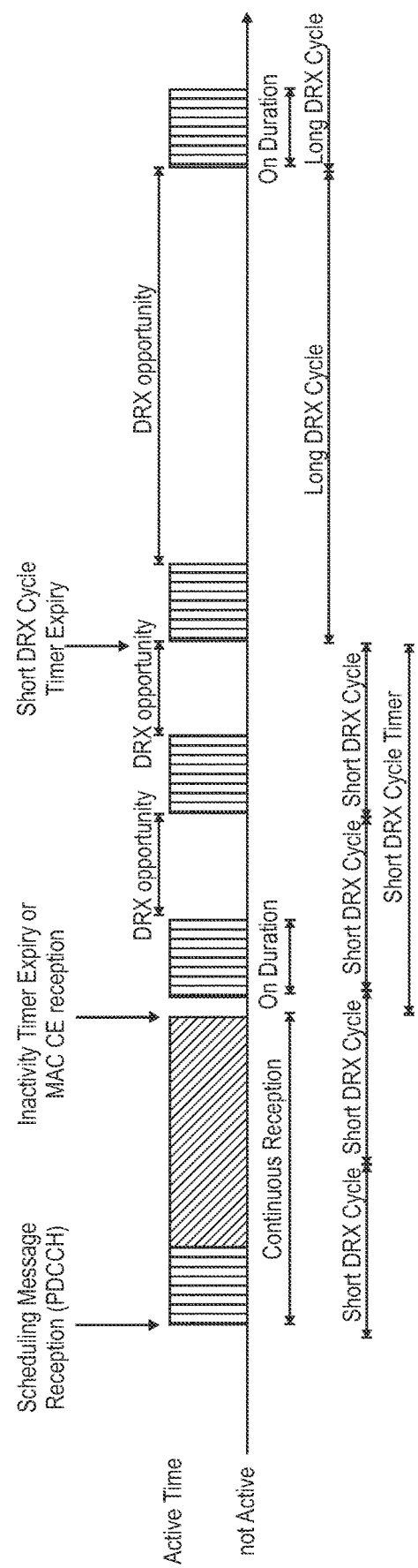
FIG. 6 illustrates the DRX operation of a mobile terminal, and in particular the DRX opportunity and on-duration periods, according to a short and long DRX cycle.

FIG. 6 discloses an example of a DRX operation. The UE checks for scheduling messages (can also be termed downlink/uplink assignment; e.g., indicated by its C-RNTI, cell radio network temporary identity, on the PDCCH) during the "on-duration" period, which is the same for the long DRX cycle and the short DRX cycle. When a scheduling message is received during an "on-duration period", the UE starts an "inactivity timer" and keeps monitoring the PDCCH in every subframe while the Inactivity Timer is running. During this period, the UE can be regarded as being in a "continuous reception mode". Whenever a scheduling message is received while the Inactivity Timer is running, the UE restarts the Inactivity Timer, and when it expires the UE moves into a short DRX cycle and starts a "short DRX cycle timer" (assuming a short DRX cycle is configured). When the short DRX cycle timer expires, the UE moves into a long DRX cycle. The short DRX cycle may also be initiated by means of a DRX MAC Control Element, which the eNB can send at any time to put the UE immediately into a DRX cycle, i.e., the short DRX cycle (if so configured) or long DRX cycle (in case the short DRX cycle is not configured).

In addition to this DRX behavior, a 'HARQ Round Trip Time (RTT) timer' is defined with the aim of allowing the UE to sleep during the HARQ RTT. When decoding of a downlink transport block for one HARQ process fails, the UE can assume that the next retransmission of the transport block will occur after at least 'HARQ RTT' subframes. While the HARQ RTT timer is running, the UE does not need to monitor the PDCCH. At the expiry of the HARQ RTT timer, the UE resumes reception of the PDCCH as normal.

The above-mentioned DRX-related timers, like the DRX-Inactivity timer, the HARQ RTT timer, the DRX retransmission timer, and the Short DRX cycle timer, are started and stopped by events such as the reception of a PDCCH grant or a MAC control element (DRX MAC CE). Hence, the DRX status (active time or non-active time) of the UE can change from subframe to subframe and thus is not always predictable by the mobile node.

At present, for carrier aggregation, a common DRX operation is applied to all configured and activated serving cells of a UE; this is also referred to as UE-specific DRX. Essentially, the Active Time is the same for all cells. Hence, the UE is monitoring PDCCH of all DL Cells in the same subframe. DRX-related timers and parameters are configured per UE, not per cell, such that there is only one DRX cycle per user equipment. All aggregated component carriers follow this "common" DRX pattern.

DRX for 5G NR and Unlicensed Cells

The basic concepts for DRX as explained above for LTE also apply to the new 5G NR, with some differences. The standardization has progressed and defined DRX, e.g., in 3GPP TS 38.321 v15.2.0 section 5.7 titled "Discontinuous Reception (DRX)", incorporated herein by reference.

The following is mentioned in TS 38.321:
RRC controls DRX operation by configuring the following parameters:
  drx-onDurationTimer: the duration at the beginning of a DRX Cycle;
  drx-SlotOffset: the delay before starting the drx-onDurationTimer;
  drx-StartOffset: the subframe where the DRX Cycle starts;
  drx-InactivityTimer: the duration after the PDCCH occasion in which a PDCCH indicates a new UL or DL transmission for the MAC entity;

drx-RetransmissionTimerDL (per DL HARQ process): the maximum duration until a DL retransmission is received;

drx-RetransmissionTimerUL (per UL HARQ process): the maximum duration until a grant for UL retransmission is received;

drx-LongCycle: the Long DRX cycle;

drx-ShortCycle (optional): the Short DRX cycle;

drx-ShortCycleTimer (optional): the duration the UE shall follow the Short DRX cycle;

drx-HARQ-RTT-TimerDL (per DL HARQ process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in subclause 5.1.5) is running; or a Scheduling Request is sent on PUCCH and is pending (as described in subclause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in subclause 5.1.4 of TS 38.321).

As apparent therefrom, the DRX for 5G NR is also based on the Long DRX cycle and Short DRX cycle and the transition between them based on a Short DRX Cycle timer, defines an On-Duration at the beginning of the DRX cycle, a DRX Inactivity timer determines the duration of continues reception after receiving a PDCCH after which the UE goes to sleep. Therefore, conceptually the 5G-NR DRX mechanism works as illustrated in FIG. 6.

It has been recently decided that a common DRX shall be used for LAA, i.e., the same DRX configuration is applied for the PCell and the SCell. DRX shall also be applied to the unlicensed radio cells (e.g., the unlicensed SCell or in standalone scenarios).

However, using DRX for unlicensed radio cell poses some additional challenges. For instance, in licensed access, the UE reachability delay introduced by DRX can be balanced by the UE power savings by properly defining the DRX parameters. On the other hand, in unlicensed access, it is uncertain that a UE can be reached by the gNB even in those cases where the UE is monitoring the PDCCH, because the gNB may fail to acquire the downlink channel due to LBT, respectively an unsuccessful CCA. Thus, the scheduling latency increases, and the UE is not reachable for a longer time. For example, if data is to be transmitted in the downlink while a UE is in the DRX sleep state, and the gNB is not able to acquire the downlink channel of the unlicensed radio cell during an On duration (i.e., CCA fails), the UE is not reachable for at least another DRX cycle, after which the gNB may again try to occupy the downlink channel to transmit downlink control information on the PDCCH to the UE.

Lengthening the ON duration would increase the flexibility for the gNB to schedule the UE, however may greatly reduce UE power savings, thus limiting the benefit of the DRX procedure as a whole.

Figure 7:
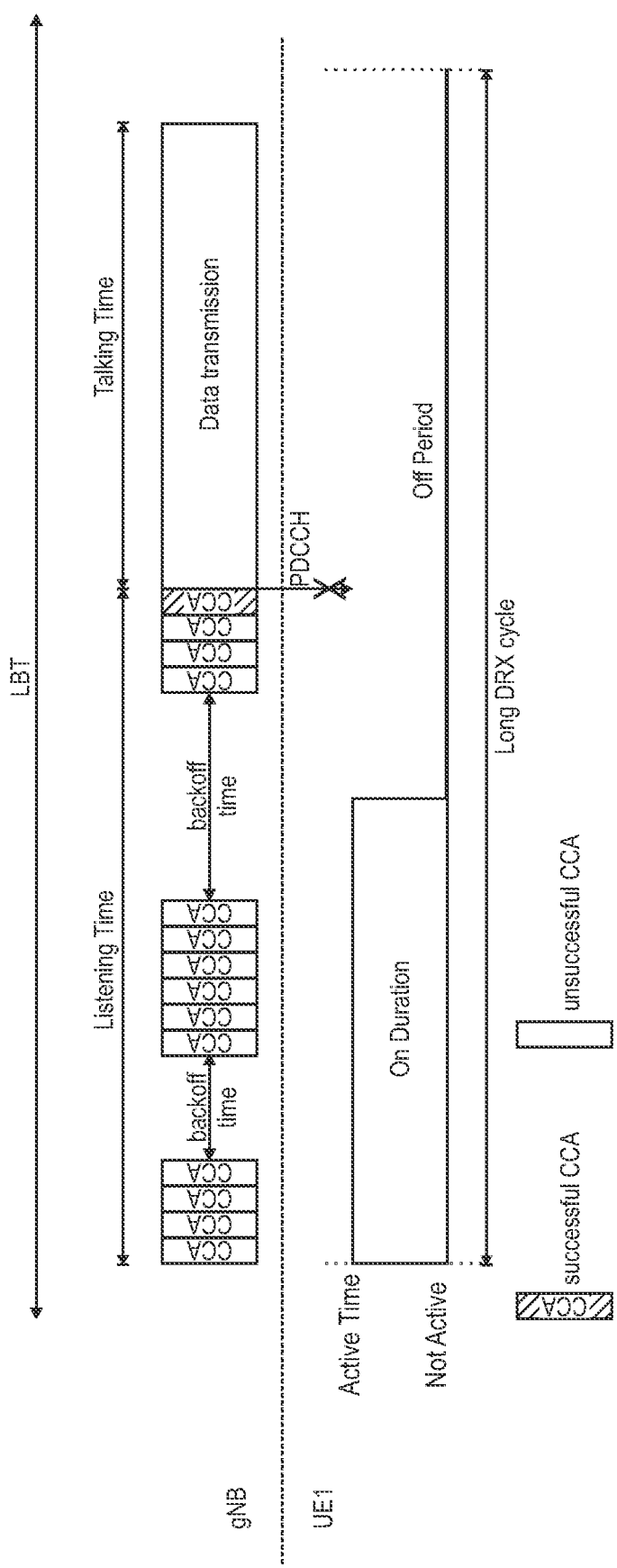
FIG. 7 illustrates the interaction between the gNB and UE for communication on an unlicensed radio cell and the DRX function.

This problem is exemplarily illustrated in FIG. 7, which shows in the upper half the gNB performing LBT by carrying out CCAs repeatedly until it is able to acquire the downlink channel in order to send downlink control information on the PDCCH to the UE for a downlink data transmission. In the lower half, the UE DRX operation is illustrated based on an On Duration according to a Long DRX cycle during which the UE is required to monitor the PDCCH and a subsequent Off period during which the UE is not required to monitor the PDCCH to save power.

As illustrated, at the time the gNB is able to occupy the downlink channel, the UE has already transitioned to the DRX sleep period ("Off Period") and thus does not monitor the downlink channels for any incoming control information. Thus, even if the gNB would transmit a PDCCH to the UE, it would not be received by the UE. The gNB would have to wait for at least the next ON-Duration to be able to schedule the UE again. However, one regulative requirement can be that the gNB cannot indefinitely occupy the downlink channel, but only for a limited amount of time, the so-called channel occupancy time (COT). Consequently, also at the next ON-Duration of the UE, the gNB may no longer occupy the downlink channel and/or might not be able to re-acquire same before the expiry of the ON-Duration. As can be seen, significant delays can be introduced by the mismatch between the DRX cycles of the UE and the LBT transmissions of the gNB.

Consequently, there is a need for defining more efficient procedures that facilitate defining a mechanism for discontinued reception, without or minimizing the problems identified above.

Detailed Description of Present Disclosure

In the following, UEs, base stations, and procedures to meet these needs will be described for the new radio access technology envisioned for the 5G mobile communication systems. Different implementations and variants will be explained as well. The following detailed disclosure was facilitated by the discussions and findings as described in the previous section "Basis of the present disclosure" and may for example be based at least on part thereof.

In general, it should be however noted that many assumptions have to be made in the following so as to be able to explain the principles underlying the present disclosure in a clear and understandable manner. These assumptions are however to be understood as merely examples that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet. Thus, terms could be changed in the 3GPP normative phase, without affecting the functioning of the embodiments of the disclosure. Consequently, a skilled person is aware that the disclosure and its scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently-used terminology for 5G NR is gNB.

The expression "monitors . . . a downlink channel . . . for a . . . signal" used in the claims and in the description should be interpreted broadly to mean that a UE tries to receive a particular signal that is transmitted on the downlink channel although the UE does not specifically know when exactly the signal is transmitted, and possibly also knows only a range of resources where the signal is transmitted. In specific and exemplary LTE and 5G-NR implementations this can be understood as monitoring one or more PDCCH candidates of one or more search spaces that are located in designated time-frequency resources known to the UE.

The expression "occupy a downlink channel of an unlicensed radio cell" and other similar expressions are to be interpreted broadly in the context of the unlicensed access, as, e.g., defined for LTE and 5G-NR. In this specific and exemplary LTE and 5G-NR context, the access to a channel by any transmitter is dependent on a clear channel assessment (CCA). If the CCA is successful, the transmitter (e.g., the gNB) can transmit on the unlicensed downlink channel and thus occupies it, e.g., blocks it such that other possible transmitter will not achieve a successful CCA.

Figure 8:
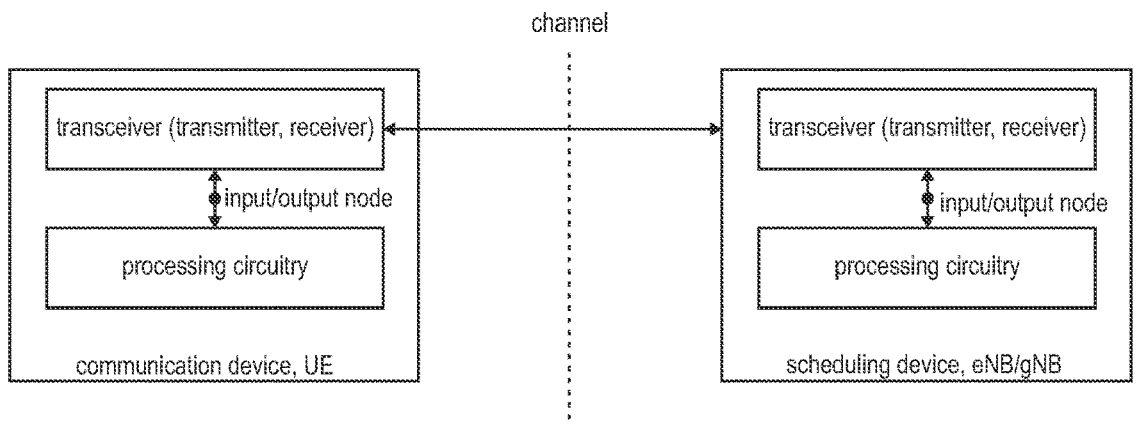
FIG. 8 illustrates the exemplary and simplified structure of a UE and a gNB.

FIG. 8 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

In the present case as will become apparent from the below disclosure of the different embodiments and variants thereof, the processor can thus be exemplarily configured to determine whether or not a channel is occupied or not by a base station. Another example refers to the processing circuitry controlling the use of different time periods during which specific processes (e.g., monitoring) are to be performed.

The receiver can in turn be configured to be able to monitor downlink channels for specific downlink control information and subsequently also for receiving the downlink control information and other downlink transmissions from a base station.

The solutions offered in the following mainly apply to the new 5G NR standardization but may apply to other scenarios such as the LAA or eLAA of previous LTE releases.

Embodiments

As explained above, operation of an unlicensed radio cell, e.g., in a stand-alone scenario, entails challenges with regard to how the UE can be informed on downlink transmissions by the gNB, while at the same time giving the UE sufficient opportunities to turn off unnecessary processing so as to save battery. The DRX operation specified for LTE and also for 5G NR (licensed access) so far does not take into account the special requirements for communicating via an unlicensed radio cell and thus is not optimal in said respect.

It is assumed for explanatory purposes that communication between the UE and the gNB is possible at least via an unlicensed radio cell, i.e., using an unlicensed frequency band. One exemplary scenario is the stand-alone scenario envisioned for 5G NR, which will be used in the following to explain the principles underlying the different solutions. But also other scenarios are possible such as for example the scenario with a licensed PCell and an unlicensed SCell. In addition, while the standalone scenario might be currently foreseen for 5G-NR but not for previous LTE releases, this might change in the future, such that also LTE might support a standalone usage of an unlicensed radio cell without being assisted by a licensed radio cell. Correspondingly, the embodiments described in the following can also be applied to unlicensed access (assisted by a licensed cell or in a standalone fashion) in previous LTE releases.

The various embodiments deal with these problems and offer a solution by facilitating to synchronize the operations at the gNB and the UE as will be explained in the following. The mechanism to be described below can be termed an improved DRX for unlicensed cells, considering that it shall provide opportunities for the UE during which it does not need to monitor downlink channels of an unlicensed radio cell and thus is able to save power. The improved DRX is based on a two-step approach, by defining two monitoring time periods during which the UE monitors the downlink control channel for different signals as well as an off-period during which the UE is not required to monitor the downlink channels in order to save power. Successively the UE monitors for a first signal, and in case the first signal is received, monitors for a second signal. The UE can either enter the off period when not receiving the first signal or after receiving the first signal but not receiving the second signal. This will be explained in more detail in the following.

In particular, a specific signal is introduced, termed exemplarily in the following channel occupancy signal, to indicate that the gNB was able to occupy the unlicensed (downlink) channel, e.g., so as to perform downlink transmissions to the UE and/or other UEs. As explained before, access to an unlicensed radio cell is only possible after successfully performing a listen-before-talk procedure, e.g., determining that the channel is clear based on the clear channel assessment. Correspondingly, if data is available in the downlink for a UE, the gNB first has to perform a CCA successfully before transmitting any data on the downlink channel to a UE.

The gNB is able to inform the UE(s) about the successful CCA by transmitting the channel occupancy signal. The channel occupancy signal is used during the first monitoring time period in the two-step DRX mechanism. Particularly, the UE wakes up and monitors the downlink channel for the channel occupancy signal for the first monitoring time period.

When receiving the channel occupancy signal during this first monitoring time period, the UE can infer therefrom that the gNB has acquired the unlicensed channel and could theoretically transmit data to the UE. On the other hand, when the UE monitors the downlink channel but does not receive the channel occupancy signal, the UE can infer therefrom that the gNB has not acquired the unlicensed channel and thus will not be able to transmit data to the UE. In this case, the UE can take the opportunity to save power and not monitor the downlink channel for some time before starting again to monitor the downlink channel for the channel occupancy signal according to the first monitoring time period.

In case the UE receives the channel occupancy signal and determines that the gNB has acquired the unlicensed channel, the UE proceeds to monitor the downlink channel for a downlink assignment that would be transmitted by the gNB to indicate to the UE that a downlink transmission is going to be performed and/or the corresponding radio resources that will be used by the gNB for the transmission in the downlink. The mentioned downlink assignment can be, e.g., similar or the same as the usual downlink assignments known in LTE and 5G NR, e.g., a DCI of Format 1. The monitoring of the downlink channel for the downlink assignment is limited to a specific time, exemplarily termed second monitoring time period.

When receiving the downlink assignment in time before expiry of the second monitoring time period, the UE will proceed and receive the corresponding downlink transmission. On the other hand, when no downlink assignment is received before the expiry of the second monitoring time period (e.g., the gNB performs downlink transmissions to one or more other UEs), the UE goes to sleep, e.g., until the next time the first monitoring time period starts, during which the UE shall monitor the downlink channel.

The UE cycles repeatedly through the different monitoring time and off periods as explained above.

Figure 9:
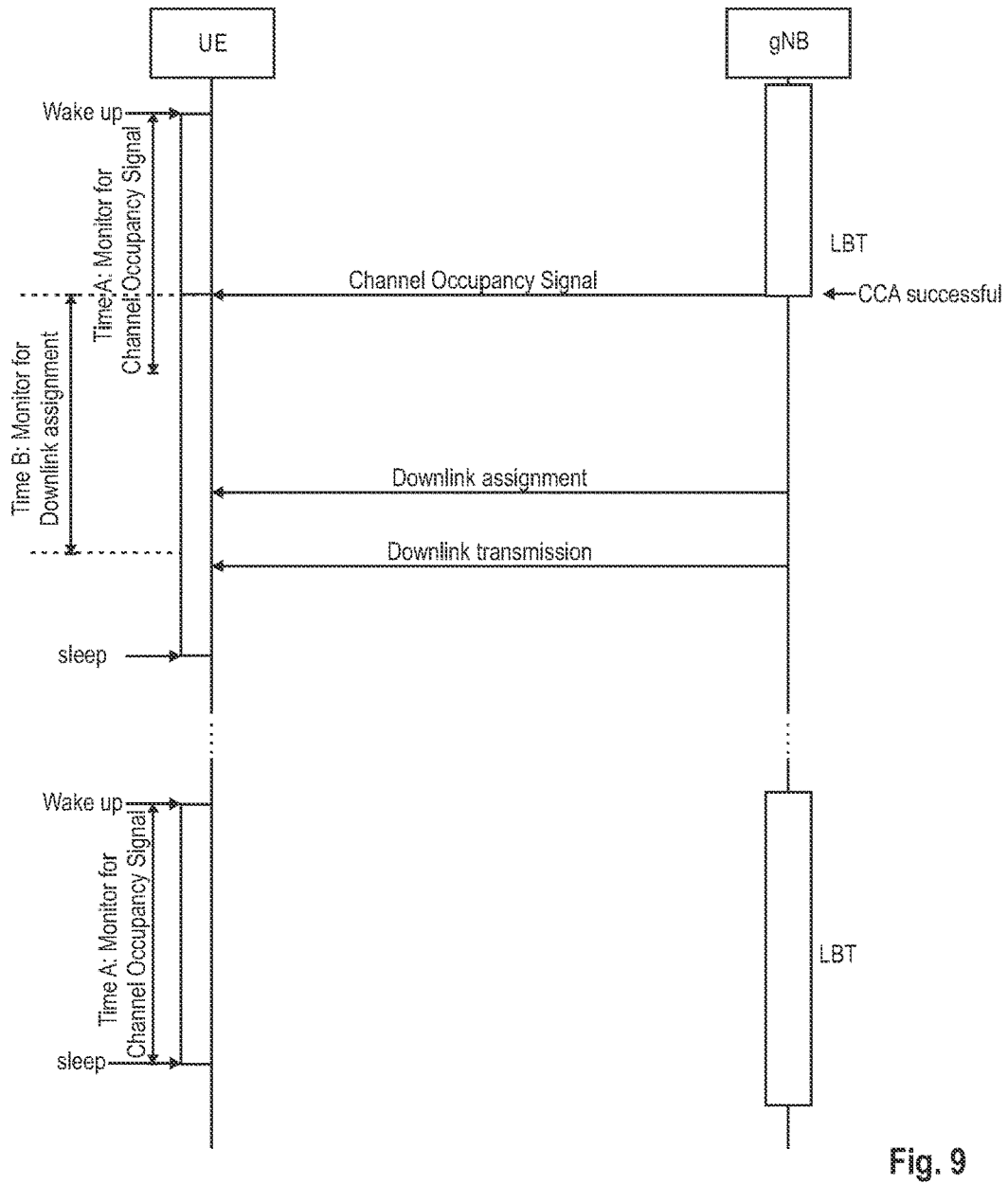
FIG. 9 is a signaling diagram illustrating an exemplary implementation of an embodiment.
Figure 10:
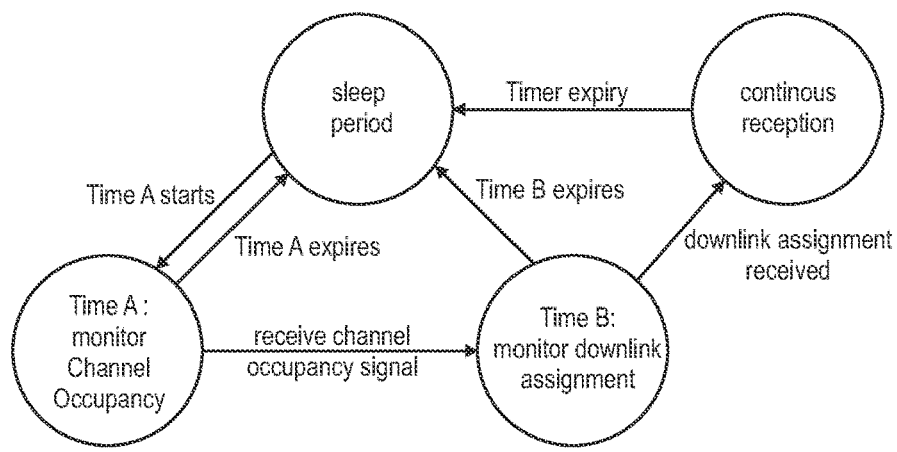
FIG. 10 is a state transition diagram for the processing at the UE regarding the different states of the UE for an exemplary implementation of an embodiment.

One exemplary exchange between the UE and the gNB according to the above-explained principles is illustrated in FIG. 9. Furthermore, FIG. 10 illustrates how the UE state changes according to one exemplary implementation of the above described principles. For illustration and explanatory purposes the first monitoring time period for monitoring the downlink channel of an unlicensed radio cell for the channel occupancy signal is termed Time A, while the second monitoring time period for monitoring the downlink channel of the unlicensed radio cell for the downlink assignment is termed Time B.

FIG. 9 shows how the gNB performs LBT until it successfully completes the CCA and subsequently transmits the Channel Occupancy Signal. The UE wakes up according to the Time A period, and correspondingly monitors the downlink channel as to whether or not a channel occupancy signal is transmitted in the unlicensed radio cell from the gNB. It is assumed that the UE receives the channel occupancy signal within Time A. During a subsequent Time B monitoring time period triggered by the reception of the channel occupancy signal, the UE now monitors the downlink channel for a downlink assignment from the gNB and indeed is able to receive in a timely manner the downlink assignment before the Time B expiry. Consequently, the UE does not enter the sleep state but continues to receive the downlink transmission corresponding to the previously received downlink assignment.

After some time (e.g., of inactivity), the UE may go to sleep and then wake up again according to a further cycle to monitor the downlink channel for the channel occupancy signal during Time A. As illustrated, it is now assumed that the gNB has not acquired the downlink channel (i.e., LBT not successful) such that the Time A period expires without the UE receiving a channel occupancy signal. Correspondingly, the UE goes to sleep and does not continue to monitor the downlink channel for some time.

In the exemplary solutions discussed above the UE basically cycles through four different states with regard to the improved DRX mechanism, illustrated in FIG. 10 as Time A, Time B, sleep period and continuous reception. Time A is a state during which the UE is supposed to monitor the downlink channel so as to determine unlicensed channel occupancy by the gNB. Time B is a state during which the UE is supposed to monitor the downlink channel for a downlink assignment so as to determine whether a downlink transmission is going to be transmitted to it. The sleep period state allows the UE the opportunity to save power by not having to monitor a downlink channel, contrary to Time A and Time B. The continuous reception state is a state after receiving the channel occupancy signal, after receiving a downlink assignment and during which the UE can receive one or more downlink transmissions (and possibly further downlink assignments, etc.).

The state transitions are also illustrated in FIG. 10 and coincide with the explanations given above. In detail, the UE enters the Time A state, e.g., periodically when the Time A period starts (for example according to a Long and/or Short DRX cycle or an SMTC measurement window, as will be explained in more detail later). When the Time A period expires (i.e., without reception of the channel occupancy signal), the UE returns to the sleep period state. On the other hand, the UE transitions from the Time A state to the Time B state, upon reception of the channel occupancy signal. From the Time B state, the UE may enter the sleep period state after expiry of Time B (i.e., without reception of downlink assignment). On the other hand, the UE transitions from Time B to the continuous reception state upon reception of a downlink assignment. A further timer expiry (e.g., a period of inactivity after receiving a downlink assignment), may trigger the UE to enter again the sleep state to save power.

Figure 11:
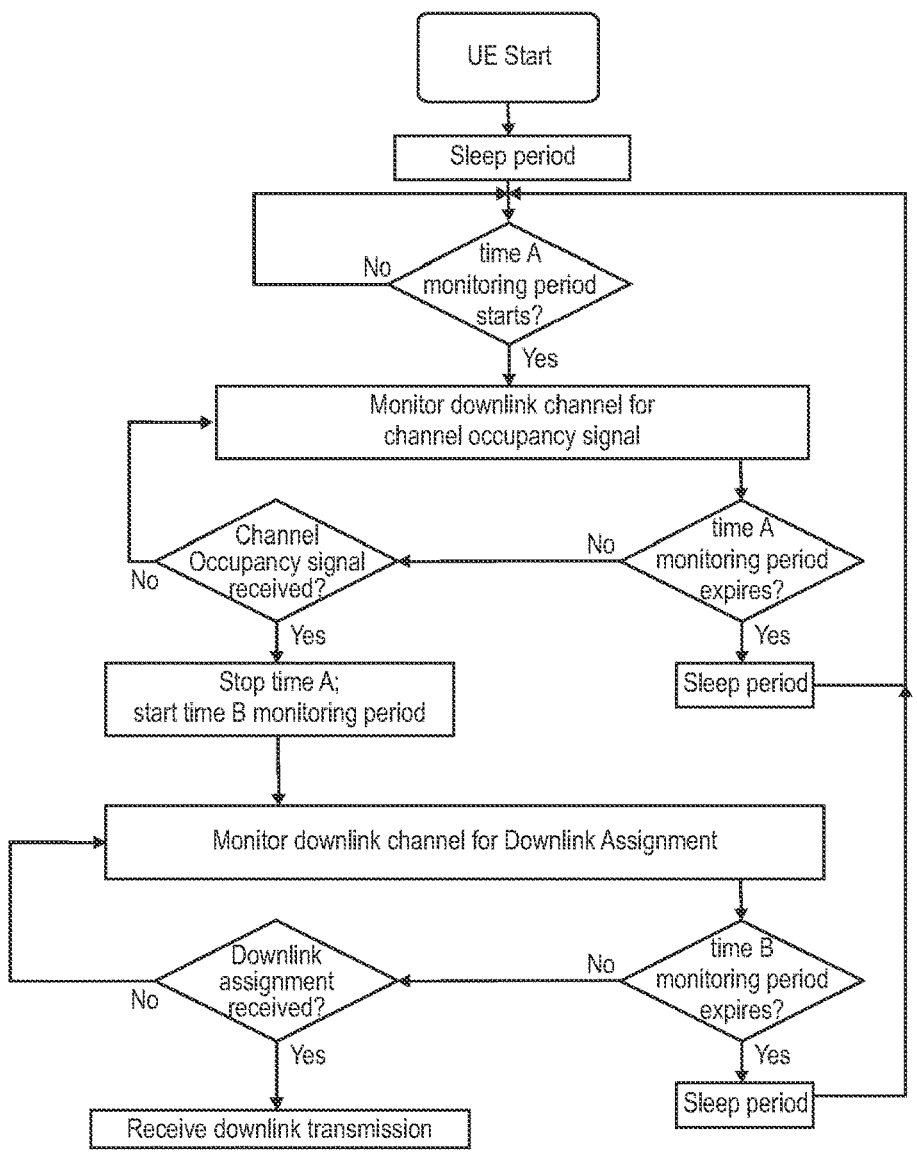
FIG. 11 is a flow diagram for the UE behavior for an exemplary implementation of an embodiment.

A flow diagram of the UE behavior according to an exemplary implementation of the above principles is illustrated in FIG. 11. As illustrated therein, the UE is in the sleep period and wakes up when the Time A period starts so as to monitor the downlink channel for the channel occupancy signal. When the corresponding Time A monitoring period expires without the UE having received a channel occupancy signal, the UE transitions to the sleep period until the next Time A period starts.

When the channel occupancy signal is received, the UE stops the Time A and on the other hand starts the Time B monitoring period during which it monitors the downlink channel for a downlink assignment from the gNB. When the corresponding Time B monitoring period expires without the UE having received a downlink assignment from the gNB, the UE may enter again the sleep period until the next Time A period starts. When the downlink assignment is received, the UE stays awake and proceeds to receive the downlink transmission corresponding to the received downlink assignment in the usual manner. Optionally, the UE may start an Inactivity timer. Upon expiry of the Inactivity Timer (and, e.g., when no further downlink assignment is received), the UE may again enter a sleep state.

Figure 12:
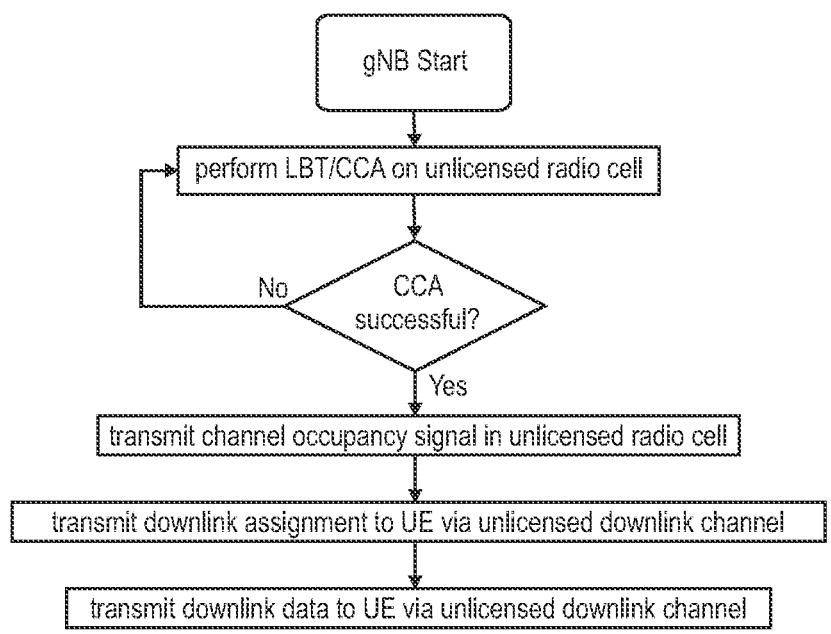
FIG. 12 is a flow diagram for the base station behavior for an exemplary implementation of an embodiment.

Part of the behavior of the gNB is already apparent from the discussion relating to the previous figures, e.g., FIG. 9. The gNB behaviour is further illustrated in FIG. 12, and will be explained in the following. Correspondingly, the gNB performs the LBT procedure to gain access to the unlicensed carrier and thus be able to perform a downlink transmission to the UE. The LBT procedure includes the clear channel assessment to determine whether the gNB can occupy the unlicensed channel. When the gNB can occupy the unlicensed channel, the gNB can transmit the channel occupancy signal in the unlicensed radio in order to indicate that the unlicensed radio cell is now occupied by the gNB. Considering that downlink data is pending for a UE, the gNB transmits a downlink assignment to the user equipment to indicate that a downlink transmission will be performed. Subsequently, the gNB transmits the downlink transmission to the UE in accordance with what was indicated in the previously transmitted downlink control information.

In further exemplary implementations of a gNB, the gNB may also determine when the UE monitors the downlink channel during the first and second time periods. In other words, the gNB knows when the UE is monitoring the downlink channels. This information can be used by the gNB, e.g., to determine whether to transmit the channel occupancy signal and/or the downlink assignment to the UE at all. For instance, when the gNB determines that the UE is not monitoring the downlink channel at all (e.g., the UE is in the Off period), the gNB can decide to not transmit the channel occupancy signal and/or the downlink assignment. On the other hand, the channel occupancy signal might be transmitted by the gNB in the radio cell irrespective of the monitoring status of the UE, since the channel occupancy signal can be received by and important for many UEs.

Figure 13:
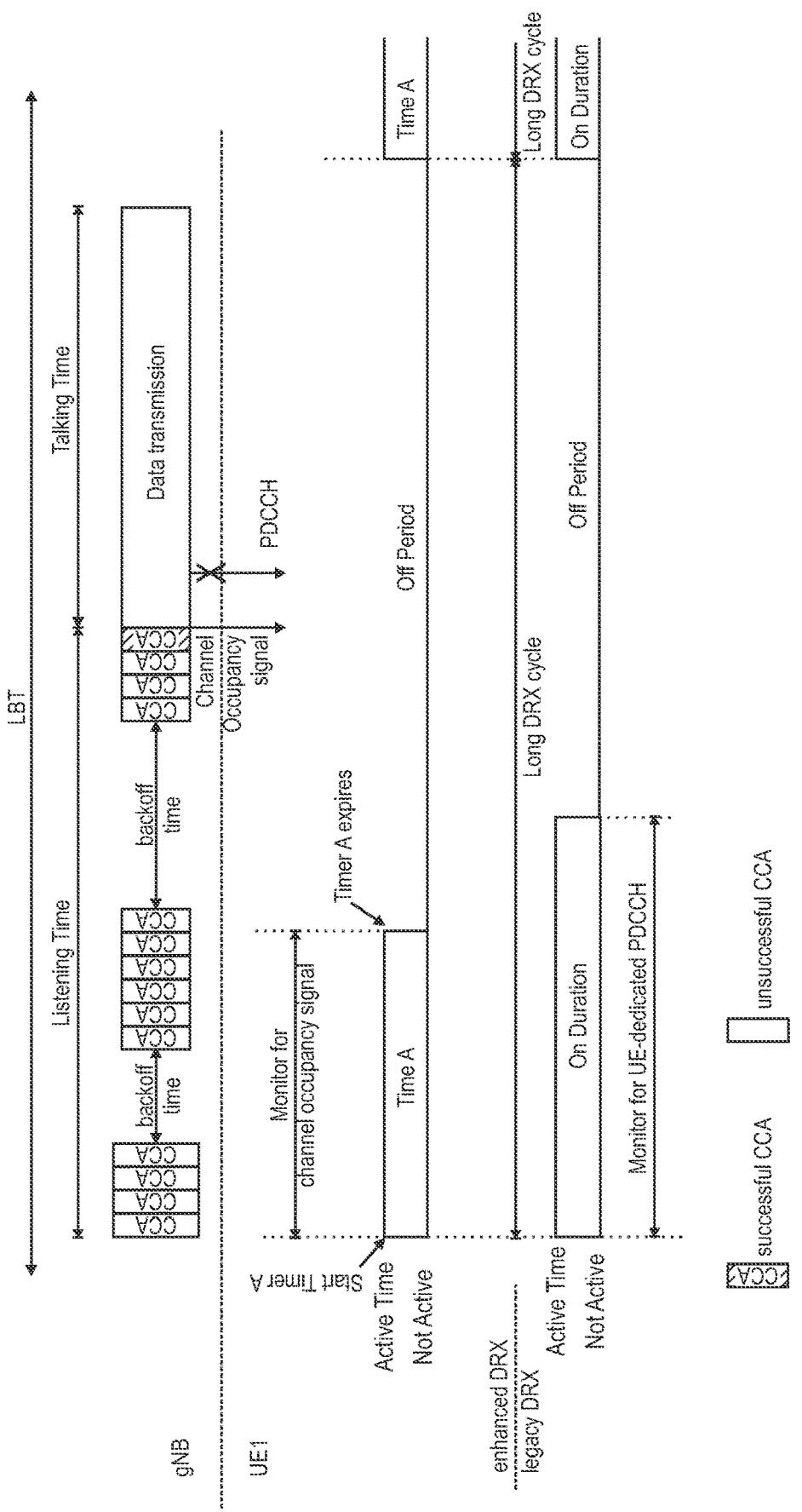
FIG. 13-15 are diagrams illustrating the interaction between the gNB and the UE when communicating on an unlicensed radio and based on an improved DRX mechanism according to an exemplary implementation of an embodiment based on respectively different exemplary scenarios.
Figure 14:
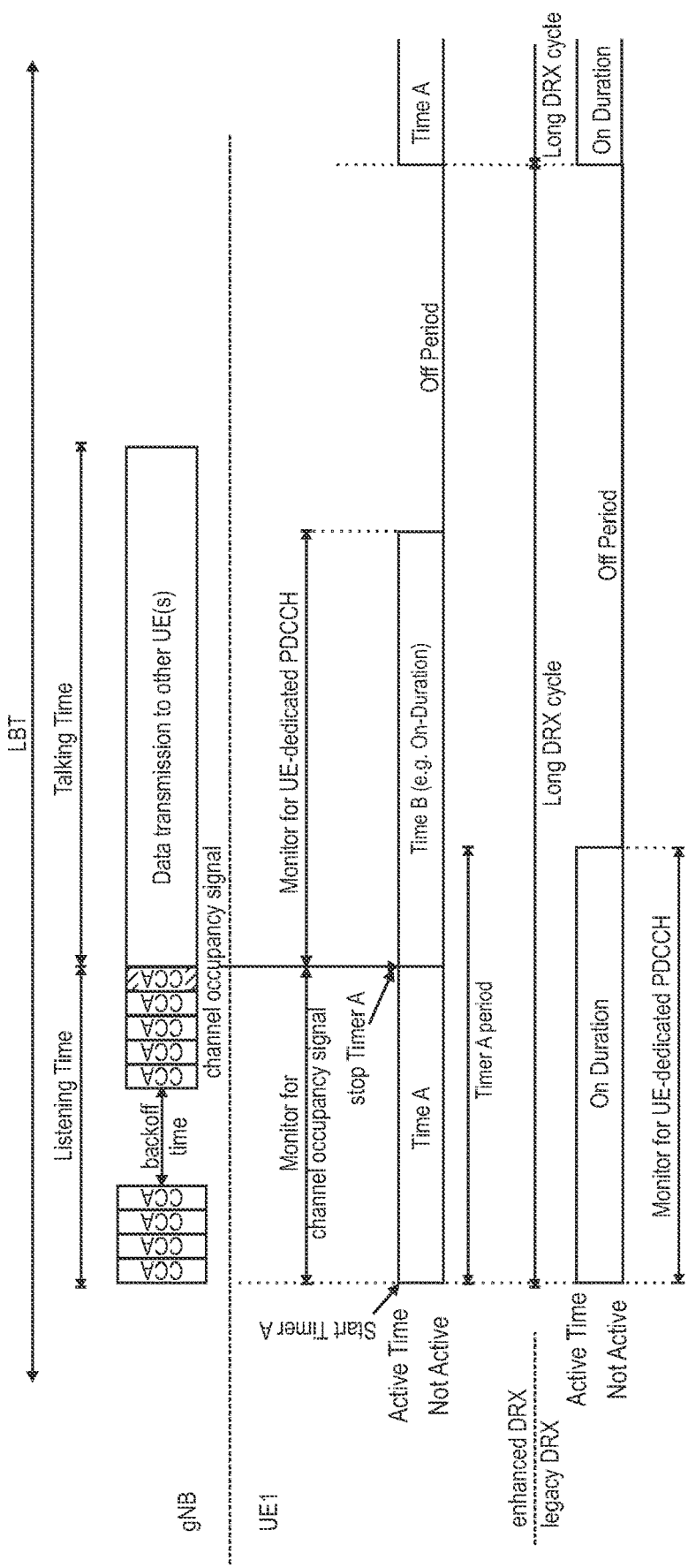
Figure 15:
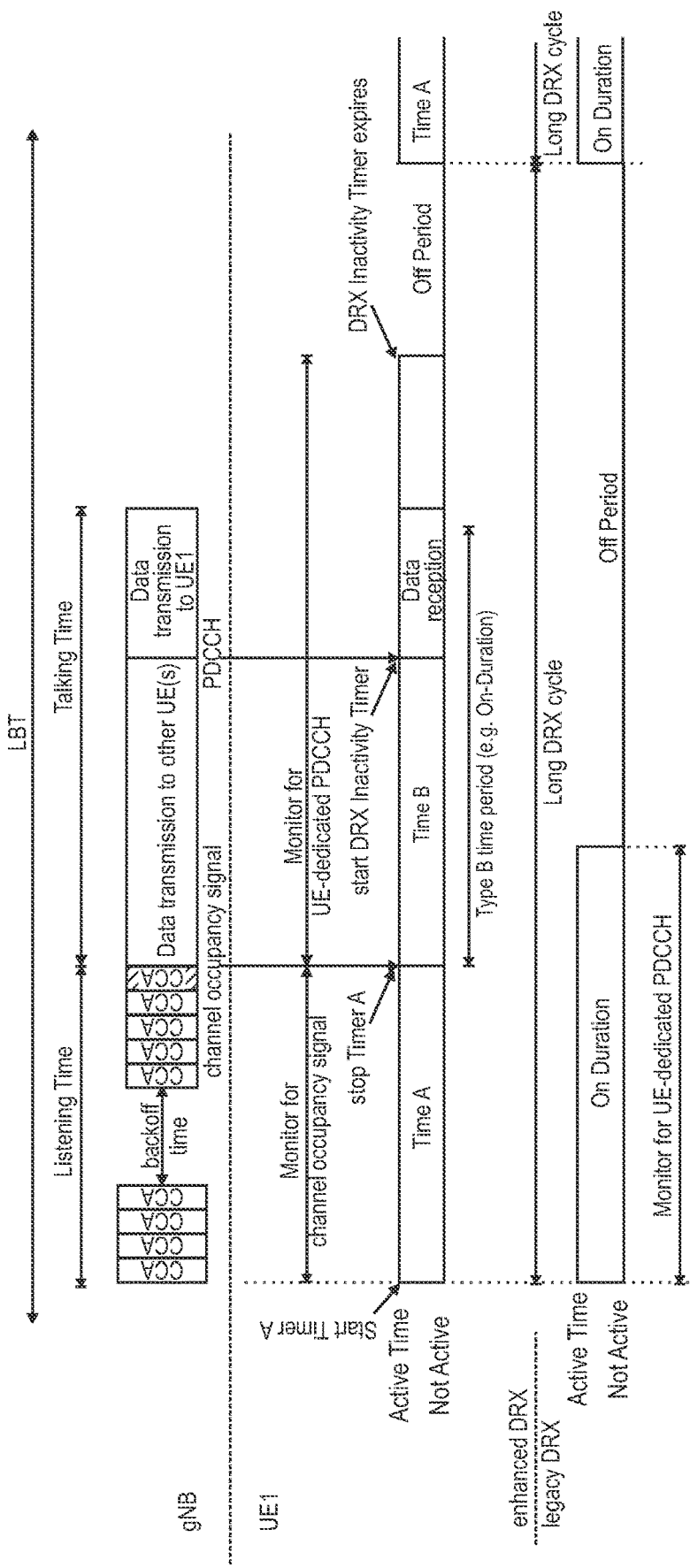

FIGS. 13 to 15 illustrate the improved DRX mechanism according to an exemplary implementation in LTE or 5G-NR. As explained before, the DRX mechanism described so far in LTE as well as for 5G-NR (legacy DRX) relies on different DRX cycles, including the Long DRX cycle and the Short DRX cycle according to which an On-Duration is started during which the UE is required to monitor the PDCCH (downlink channel) for DCIs (downlink assignments). In a further implementation of the present embodiment, the parameters already established and defined for legacy DRX could be re-used for the DRX operation in unlicensed radio cells. Thus, the improved DRX mechanism would align with the legacy LTE/5G-NR design defined for licensed cells. For instance, the Time A monitoring period can be defined to start with the Long DRX cycle, similar to the On-Duration period in legacy DRX. Correspondingly, a Long DRX cycle is defined for the UE, which includes a Time A period at the beginning. When the Long DRX cycle starts, the Time A period starts and the UE starts monitoring the downlink channel for the channel occupancy signal. As explained before, the UE proceeds with either processing according to the Time B period (in case channel occupancy signal is received) or according to the off period (if no channel occupancy signal is received). The next Time A period is started according to the Long DRX Cycle, e.g., when the next Long DRX cycle starts.

FIGS. 13 to 15 respectively illustrate the case, where no channel occupancy signal is received (FIG. 13), where the channel occupancy signal but no downlink assignment is received (FIG. 14) and where the channel occupancy signal as well as the downlink assignment is received (FIG. 15). At the bottom of the respective FIGS. 13 to 15, the legacy DRX mechanism is displayed allowing a comparison of the improved DRX mechanism with the legacy DRX operation.

For illustration and explanatory purposes it is exemplarily assumed that the Time A period is shorter than the On Duration period in the legacy DRX mechanism and that the Time B period has the same length as the On Duration period in the legacy DRX mechanism. However, as will be explained in detail later, the duration of the Time A period and the Time B period can be the same as, shorter or longer than the On Duration period.

The gNB behavior is illustrated in FIG. 13 to comprise the CCA and a backoff time after a series of CCA as part of the LBT procedure. The channel occupancy signal is transmitted by the gNB upon successfully acquiring the unlicensed channel. It is assumed that the gNB acquires the unlicensed frequency band only after the Time A monitoring period of the UE has already expired, i.e., the UE is at that time already in the Off period and will thus not be monitoring the PDCCH to receive the channel occupancy signal. Here, it is assumed that the channel occupancy signal is transmitted nonetheless by the gNB, e.g., in order for other UEs to receive same to be aware that the gNB has occupied the unlicensed band. The PDCCH for the UE may however not be even transmitted to the UE, since the gNB knows that the UE is in the Off period. Rather, if data is pending for other UEs, the gNB may proceed to perform downlink transmissions to other UEs and may try to schedule the downlink data to the UE later. The UE enters the Time A period again at the beginning of the next Long DRX cycle.

In the exemplary scenario assumed for FIG. 13, the operation of the legacy DRX mechanism would have had basically the same results because the PDCCH would have been transmitted outside the On Duration period. However, by having a Time A period that is shorter in length than the On Duration period, it is furthermore possible for the UE to transition earlier from the Active Time to the Off period and thus to save more power.

In the exemplary scenario of FIG. 14 it is assumed that the gNB is able to acquire the downlink channel at an earlier time, i.e., during the Time A monitoring period of the UE. The gNB transmits the channel occupancy signal, and the UE will receive the signal accordingly. As explained above, the UE, upon receiving the channel occupancy signal, enters the Time B monitoring period and monitors for reception of a downlink assignment from the gNB. However, FIG. 14 assumes that the gNB does not perform a downlink transmission to the UE such that no downlink assignment (PDCCH) is transmitted to the UE, e.g., either because there is no data pending for the UE in the downlink or because a downlink transmission to the UE is not possible before expiry of the Time B period. Instead, downlink transmissions may be performed to other UE(s). The Time B period expires without having received a downlink assignment, and the UE transitions to the Off period to save power. The UE transitions again to the Time A period, at the beginning of the next Long DRX cycle.

Compared to FIG. 14, in the exemplary scenario of FIG. 15 it is assumed that the gNB is able to perform the downlink transmission to the UE in time, i.e., before the Time B period expires. Correspondingly, the gNB transmits the PDCCH downlink assignment for a downlink transmission during the Time B period, which the UE receives. In the simplified illustration of FIG. 15, the UE and gNB then continue with the data reception respectively data transmission in line with the downlink assignment of the PDCCH.

The operation of the legacy DRX mechanism illustrated at the bottom of FIG. 15 shows that the PDCCH downlink assignment transmission would have been performed during the Off period. Thus, no downlink transmission to the UE would have been possible, introducing further delay for the data transmissions. By additionally introducing the Time A period, the PDCCH monitoring Time A period (corresponds to On Duration period in legacy DRX) is shifted back in time, thus allowing the network more time to access the unlicensed radio cell and more flexibility for performing a transmission to the UE. On the other hand, the UE has less opportunity to save power due to the additional monitoring Time A. However, a trade-off is possible between the additional power usage vs. the greater flexibility and reduced delay for downlink transmissions. The corresponding length of the Time A period can be appropriately configured, e.g., by the network, and may additionally be dynamically configured.

More detailed implementations and variants of the above-described solutions will be described in the following.

In particular, the different periods of the improved DRX mechanism could, e.g., be configured by the gNB. Generally, the configuration of the necessary parameters for the Time A and Time B periods can be indicated to the UE by use of different signaling, i.e., in a system information broadcast (such as in a particular System Information Block), by RRC signaling dedicated to the UE (such as RRC Reconfiguration message), in a PDCCH DCI dedicated to the UE (such as DCI Format 2_0 or DCI Format 2_1 or another new DCI format), or in a PDCCH DCI for a group or the complete cell.

The parameters may include the length of the Time A and Time B periods and the periodic beginning of the Time A period. For instance, the Time A and Time B period lengths could be the same as the On-Duration length defined for the legacy DRX period. On the other hand, the Time A and Time B period lengths can be shorter or longer than the On-Duration length defined for the legacy DRX period. For example, a relatively short Time A length (e.g., shorter than On Duration) would allow the UE to save more power in those cases where the gNB is not able to occupy the downlink channel of the unlicensed radio cell (as explained above in connection with FIG. 13). On the other hand, a relatively long Time A length (e.g., longer than On Duration) would allow the gNB more time and flexibility to schedule a downlink transmission to the UE. Similar considerations may guide the configuration of the Time B period length.

Moreover, the start of the Time A period can be coupled to the Long DRX cycle as explained above, i.e., every time a Long DRX cycle starts, the Time A period starts, and thus the UE is required to monitor the downlink channel for the channel occupancy signal. The Time A may start immediately after the Long DRX cycle starts, but may also start with a time offset after the Long DRX cycle starts.

The start of the Time B period is dependent on the successful reception of the channel occupancy signal and can, e.g., start immediately after the reception of the channel occupancy signal, but may also start with a time offset after the reception of the channel occupancy signal.

Figure 16:
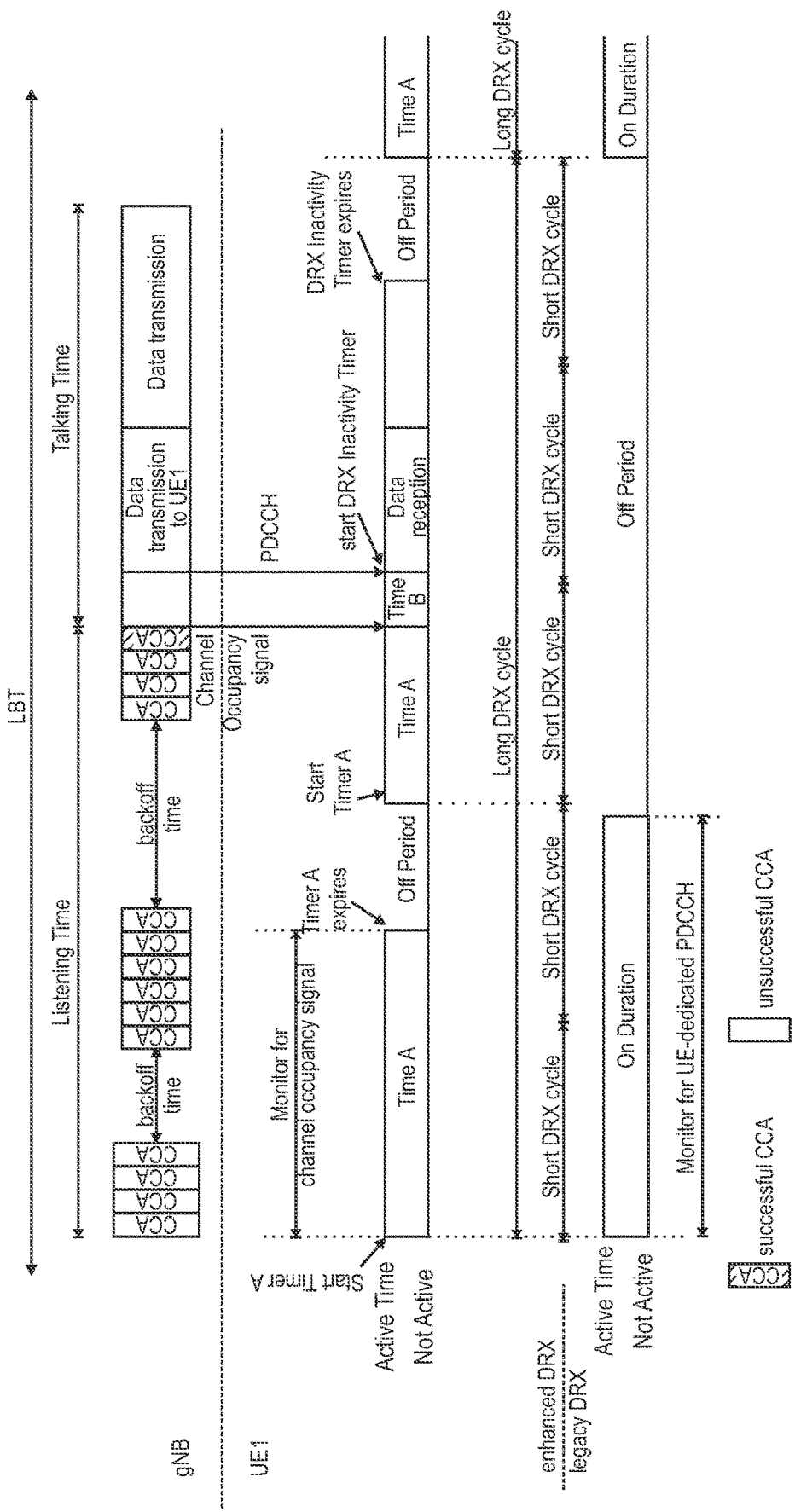
FIG. 16-17 are diagrams illustrating the interaction between the gNB and the UE when communicating on an unlicensed radio and based on an improved DRX mechanism according to another exemplary implementation of an embodiment taking into account the Short DRX cycle too.

A further variant of the embodiment takes the Short DRX cycle into account for the improved DRX mechanism. As explained before, a Short DRX cycle can optionally be configured for the known DRX mechanism, to which the UE transitions after the Inactivity timer expires (Short DRX cycle timer then control transition to the Long DRX cycle). Thus, if a Short DRX cycle is configured for the UE, this improvement could be used. Some of the previously described solutions rely on the Long DRX cycle to periodically start the Time A period during which the UE monitors the downlink channel for the channel occupancy signal. Consequently, the UE would thus monitor the downlink channel for the channel occupancy signal during at least one further time within that Long DRX cycle. This solution is illustrated in FIG. 16, which assumes an exemplary scenario (similar to the one underlying FIG. 13) according to which the gNB is not able to acquire the downlink channel of the unlicensed radio cell during the first Time A monitoring period (started with the Long DRX cycle).

To optimize the UE behavior, it can be foreseen, that in case the UE monitors and does not receive the channel occupancy signal during the Time A period, the UE may again start the Time A period according to the Short DRX cycle within that Long DRX cycle. According to the improvement illustrated in FIG. 16, the UE follows the configured Short DRX Cycle temporarily during the Long DRX Cycle to trigger a further Time A monitoring period, during which the UE shall again monitor the downlink channel for the channel occupancy signal. As illustrated, the UE is thus able to detect the channel occupancy signal and enter the Time B monitoring period in order to receive the downlink assignment (PDCCH in the FIG. 16) and the subsequent downlink data ("Data reception" respectively "data transmission to UE1" in FIG. 16).

Consequently, by additionally starting the Time A monitoring period according to the Short DRX cycle within the Long DRX cycle, there are further opportunities for the UE to receive a channel occupancy signal from the gNB and thus possibly the downlink data pending for the UE. The channel occupancy signal detection can be thus speeded up.

Figure 17:
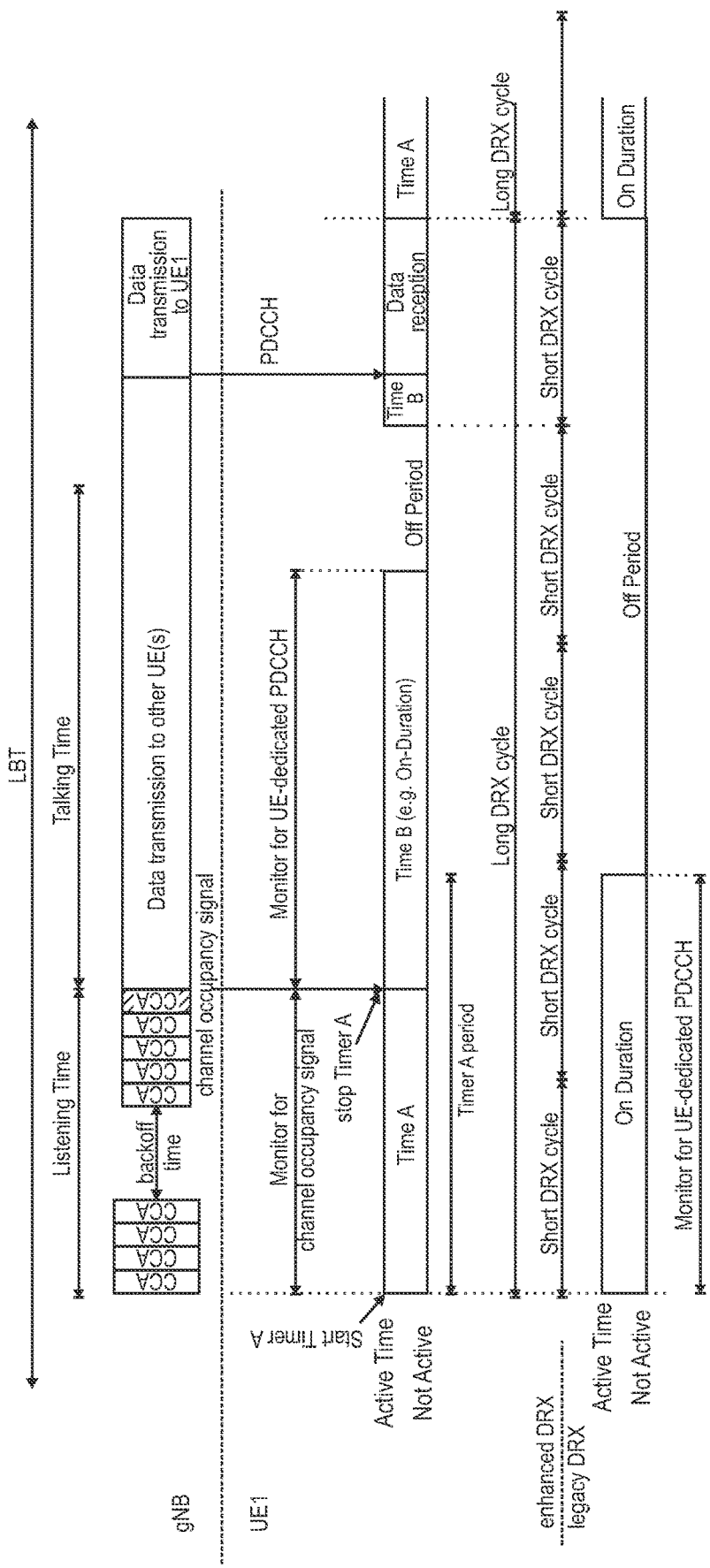

According to a further exemplary implementation, the start of the Time B period (rather than the Time A period) is additionally triggered according to Short DRX cycle as will be explained. In particular, the UE would thus monitor the downlink channel for the downlink assignment during at least a further Time B period within the Long DRX cycle. This solution is illustrated in FIG. 17, which assumes an exemplary scenario (somewhat similar to the one underlying FIG. 14) according to which the gNB is able to acquire the downlink channel and transmit the channel occupancy signal to the UE during the Time A period, however is not able to perform a downlink transmission to the UE in time during the Time B period directly succeeding the Time A period. The solution of FIG. 17 is different in that at the next start of the Short DRX cycle within that Long DRX cycle a further Time B period is triggered, during which the UE shall monitor the downlink channel for the downlink assignment. As apparent, it is assumed that the gNB transmits a PDCCH to the UE during this additional Time B, which the UE receives and based on which the UE can subsequently receive the downlink data. As before, the next Time A monitoring time would start with the next Long DRX cycle.

There are several possibilities on how to implement the channel occupancy signal described above. Conceptually, the presence of any signal transmitted by the gNB in the downlink of the unlicensed radio cell can already be used as the channel occupancy signal, because the gNB does not transmit any signal in the downlink before acquiring the downlink channel. The channel occupancy signal may be a one-time signal transmitted once after acquiring the downlink channel, but may also be transmitted more often during the channel occupancy time (i.e., while the unlicensed channel is occupied by the gNB in the downlink).

For example, it may be implemented as a particular reference signal broadcast by the gNB in its unlicensed radio cell. There are several reference signals already defined for 5G NR, described in detail, e.g., in TS 38.211 v15.2.0 sections 6.4 for uplink and 7.4 for downlink, respectively incorporated herein by reference. In the downlink for example, there is the demodulation reference signal for the PDSCH and PDCCH and PBCH, in addition to the CSI reference signal and the Phase-Tracking reference signal.

In one exemplary implementation, a new reference signal can be defined for the purpose of indicating that the channel of the unlicensed radio cell has been occupied. The gNB may configure a new sequence for this reference signal for all NR UEs operating in the unlicensed band. After the UE performs sequence correlation and could not detect the sequence, the UE can assume that there is no transmission on the NR-Unlicensed cell. On the other hand, if the sequence correlation result is above a particular threshold, then the UE assumes that the gNB has occupied the downlink.

In another exemplary implementation, the channel occupancy signal is the demodulation reference signal (DMRS), e.g., for the PDCCH or PDSCH that is already defined for 5G-NR and transmitted by the gNB. It is assumed that the DMRS is only then transmitted by the gNB in the unlicensed radio cell, in case it acquired the downlink channel. Consequently, when detecting the DMRS, the UE will determine that the gNB has indeed acquired the downlink channel. In said respect for example, the gNB configures a common sequence of the DMRS for all NR UEs operating in the unlicensed band. After the UE performs sequence correlation and could not detect the sequence, then the UE can assume that there is no transmission on the NR-Unlicensed cell. On the other hand, if the sequence correlation result is above a particular threshold, then the UE assumes that the gNB has occupied the downlink channel.

Another option is to transmit the channel occupancy signal as downlink control information, e.g., in a common search space. As explained above, the transmission of control information in the downlink is implemented in 5G-NR (and similarly also in LTE) based on DCIs of different formats and transmitted in particular search spaces in the radio resources in which the DCIs can be transmitted. Conceptually, the common search space is decoded by all UEs and is thus typically used for transmitting information to all UEs reachable by the gNB, whereas a UE-specific search space is specific to one UE and thus only decoded by the one UE, but not other UEs.

One of the already defined DCIs can be defined to be the channel occupancy signal. For instance, DCIs can be transmitted in the common search space and scrambled with a common identifier of the UE, such as the SFI-DCI 2_0 scrambled with the SFI-RNTI or the DCI Format 2_1 scrambled with the INT-RNTI already defined by 5G-NR. Consequently, when detecting the SFI-DCI 2_0 and/or the DCI Format 2_1, the UE will determine that the gNB has indeed acquired the downlink channel. Another option is to use system information as the channel occupancy signal scrambled by the SI-RNTI.

In addition or alternatively, the DCIs discussed above may be extended by at least one additional bit to indicate whether or not the channel is indeed acquired.

Alternatively, a new DCI can be defined for the purpose of implementing the channel occupancy signal, possibly using a new RNTI specifically for said purpose. The new DCI may include at least one bit to indicate whether or not the downlink channel is indeed acquired by the gNB. The new DCI can be transmitted very frequently.

As explained above, there are several different ways to implement the channel occupancy signal.

Further, the channel occupancy signal can be transmitted only one time or several times during the channel occupancy time which may also depend on the implementation of the channel occupancy signal discussed above.

It was explained before, that the length of the Time B period could be, e.g., the same as the On Duration period of the legacy DRX mechanism. On the other hand, the length of the Time B period can also be restricted considering the channel occupancy time of the gNB. In particular, the channel occupancy time is the maximum time the gNB is allowed to occupy the downlink channel of an unlicensed radio cell after first acquiring it. Consequently, the UE does not need to monitor the downlink channel for a downlink assignment after the channel occupancy time of the gNB expired. Thus, if the UE knows when the channel occupancy time of the gNB expires, it may stop the monitoring process during the Time B period appropriately so as to save further power.

There are several possibilities on how the UE may learn when the maximum channel occupancy time of the gNB ends. For instance, information about the channel occupancy time can be transmitted to the UE from which the UE may infer when the channel occupancy time ends. For instance, the channel occupancy signal may be understood to indicate the beginning of the channel occupancy of the gNB and the end of the channel occupancy can be determined there from based on the maximum channel occupancy time information.

The information on the channel occupancy time can take different forms. For instance, the channel occupancy time expiry can be indicated by pointing to the corresponding frame number at which the gNB is no longer allowed to occupy the downlink channel. Alternatively, the maximum length of the channel occupancy time can be indicated, such that the UE can infer the expiry of the channel occupancy based on the maximum length of the channel occupancy time and the start time of the channel occupancy (e.g., the time when the channel occupancy signal is received). As still a further option, the remaining time of the channel occupancy can be indicated, e.g., in terms of symbols or slots or subframes or radio frames. Then the COT is transmitted repeatedly during the channel occupancy time, the remaining COT value is updated accordingly.

The gNB can transmit information on the channel occupancy time to the UE for instance together with the channel occupancy signal. How to incorporate this information on the channel occupancy time may also depend on the implementation of the channel occupancy signal. For instance, when using the SFI-DCI transmitted in the common search space, the corresponding format of the DCI has to be either extended by further bit(s) to be able to carry the information on the channel occupancy time or introduce new DCI format that could be scrambled with new RNTI.

When using a new DCI for the purpose of implementing the channel occupancy signal, it may be extended further to include information to allow the UE to determine when the channel occupancy time of the gNB expires. This is especially helpful when the DCI is transmitted frequently, such that the remaining length of channel occupancy time for being carried in the new DCI is updated for each transmission of the new DCI (the channel occupancy signal).

In addition or alternatively, the information on the channel occupancy time can be transmitted separately from the channel occupancy signal, e.g., included in one of a common or UE-specific DCI.

A further improvement can be achieved by providing additional information to the UE about time periods within the Time B period during which the UE does not need to monitor the downlink channel for the downlink assignment. This would allow the UE to save even more power. In particular, this additional information could be transmitted by the gNB to the UE, e.g., together with the channel occupancy signal. In one exemplary implementation, this additional information indicates particular uplink periods (e.g., uplink slots or uplink OFDM symbols) during which no downlink communication from the gNB is to occur and which thus do not need to be monitored by the UE. As such, it provides similar or the same information as the SFI-PDCCH, although it can be transmitted more often together with the channel occupancy signal.

According to one exemplary solution presented above, the triggering of the Time A period (and thus also the Time B period) is coupled to the long/short DRX cycle. As an alternative exemplary implementation, instead of the DRX cycle(s) the improved mechanism follows the periodicity according to the SSB measurement timing configuration (SMTC) defined for 5G NR in the context of providing the synchronization signals to the UE. As discussed before, the SSB-MTC configuration includes the definition of a periodicity and duration of an SMTC 1 measurement window in which to receive the synchronization signals/PBCH blocks. It should be noted that the SMTC 1 measurement window typically occurs more frequently than the DRX cycle, especially the Long DRX cycle. The Time A and Time B periods can be synchronized with this SMTC 1 measurement window for the current cell.

In particular, at the start of the SMTC 1 measurement window (can also be termed SMTC monitoring period), the UE triggers the Time A monitoring period and monitors the downlink channel for the reception of the channel occupancy signal during Time A. The further operation can be basically the same as discussed before in connection with the other solutions, e.g., the Time B monitoring period is triggered when the UE is able to detect and receive the channel occupancy signal from the gNB within Time A. The UE correspondingly monitors the downlink channel for a downlink assignment during the subsequent Time B period. The next Time A period is triggered with the start of the next SMTC measurement window.

Other aspects discussed with respect to the DRX-based implementation of the solution, can be equally applied to the SMTC-based implementation of the solution. For instance, the length of the Time A period can stay the same, although it might be possible to have a longer Time A period length than in the DRX-based solution. On the other hand, the Time A period can also be shorter than in the DRX-based solutions considering that the SMTC-based solution triggers the Time A period more frequently.

As another example, the length of the Time B period can, e.g., be restricted to the channel occupancy time of the gNB, so as to avoid that the UE still monitors the downlink channel after the gNB does no longer occupied downlink channel. Correspondingly, the information on the channel occupancy time of gNB can be provided to the UE in one of the above described ways.

Figure 18:
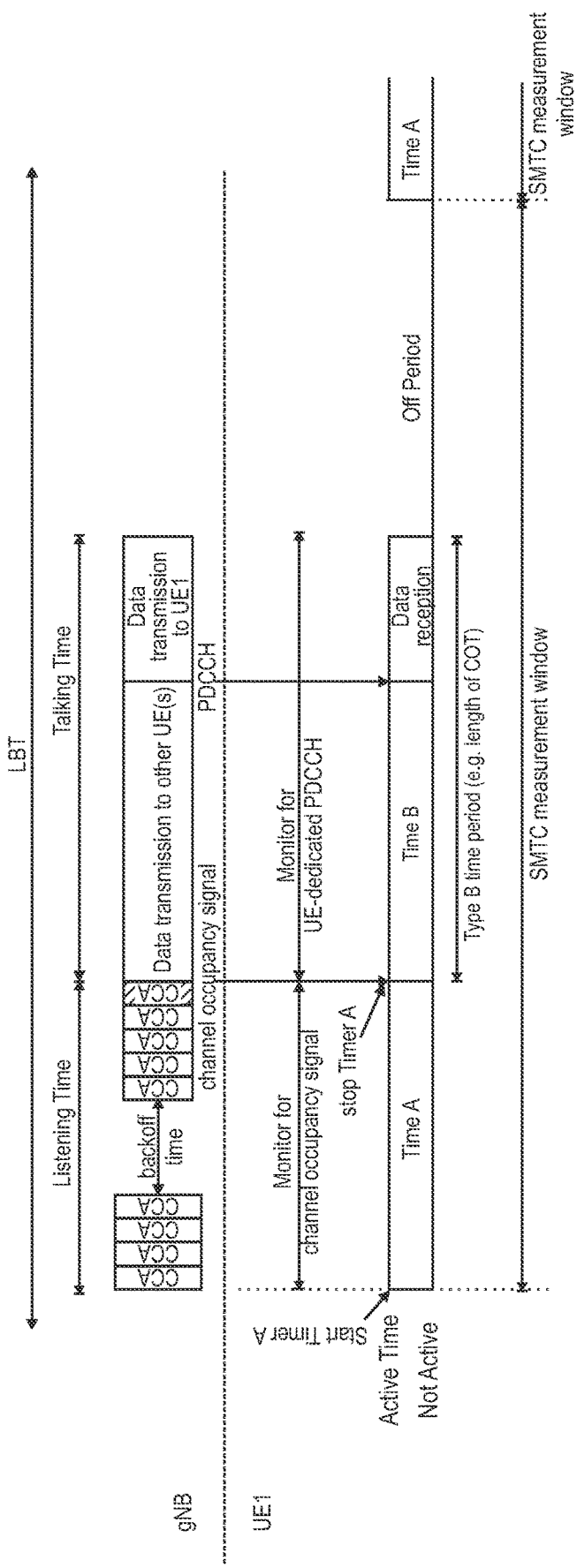
FIG. 18 is a diagram illustrating the interaction between the gNB and the UE when communicating on an unlicensed radio and based on an improved DRX mechanism according to another exemplary implementation of an embodiment which triggers the different periods based on an SMTC measurement window.

An exemplary implementation of the SMTC-based solution assuming a particular exemplary scenario similar to the one underlying FIG. 15 is illustrated in FIG. 18. As apparent therefrom, the Time A period starts with the SMTC measurement window of the UE. It is exemplarily assumed that the Time B period has the length of the channel occupancy time (COT). Although not illustrated, the UE may take the opportunity to go into a sleep state similar to what was already discussed before (see discussion before in connection with, e.g., FIGS. 10 and 11), e.g., in case the channel occupancy signal is not received during Time A or the downlink assignment is not received during Time B. The UE goes to the sleep state after Time B. Consequently, the UE does not stay awake longer than Time B. As a difference to the previous DRX-based solution, no DRX inactivity timer is used, but the Time B is optionally set to the COT time such that it is synchronized with the channel occupation by the gNB.

Further Aspects

According to a first aspect, a user equipment is provided comprising a receiver, which in operation, monitors, during a first time period, a downlink channel of an unlicensed radio cell for a channel occupancy signal that is transmitted by a base station communicating with the user equipment via the unlicensed radio cell of a mobile communication system. The channel occupancy signal indicates that the base station occupies the downlink channel to perform downlink transmissions. The receiver, in operation, receives the channel occupancy signal during the first time period from the base station. A processor, when in operation, determines that the base station occupies the downlink channel based on the received channel occupancy signal. After determining that the base station occupies the downlink channel, the receiver, when in operation, monitors, during a second time period, the downlink channel for downlink control information regarding a downlink transmission to be received by the user equipment. The receiver, when in operation, receives the downlink control information during the second time period and receives subsequently the downlink transmission from the base station based on the received downlink control information.

According to a second aspect provided in addition to the first aspect, in case the channel occupancy signal is not received during the first time period, the user equipment is not required to monitor the downlink channel neither for the channel occupancy signal nor for the downlink control information during a sleep time period that starts at the expiry of the first time period. Optionally, in case the downlink control information is not received during the second time period, the user equipment is not required to monitor the downlink channel neither for the channel occupancy signal nor for the downlink control information during a sleep time period that starts at the expiry of the second time period.

According to a third aspect provided in addition to the first or second aspect, wherein the channel occupancy signal is at least one of the following:
- a reference signal broadcast by the base station in the unlicensed radio cell, optionally wherein the reference signal is a demodulation reference signal,
- downlink control information transmitted in a common search space of the downlink channel, optionally wherein the downlink control information is scrambled with a common UE identity such as the Slot Format Indicator Radio Network Temporary Identifier, SFI-RNTI, or the Interrupted Transmission Indicator RNTI, INT-RNTI or the System Information RNTI, SI-RNTI of a 5G-NR communication system.

According to a fourth aspect provided in addition to any of first to third aspects, the first time period starts every time when a Long Discontinuous Reception, DRX, cycle starts, the Long DRX cycle being part of a DRX function operated at the user equipment. Optionally, in case the channel occupancy signal is not received during the first time period started when the Long DRX cycle starts, the receiver, when in operation, monitors the downlink channel for the channel occupancy signal during another first time period additionally started when the next one or more Short DRX cycle starts within the remaining Long DRX cycle. Optionally, in case the channel occupancy signal is received during the first time period and the downlink control information is not received during the second time period, the receiver, when in operation, monitors the downlink channel for the downlink control information during another second time period additionally started when the next or more Short DRX cycle starts within the remaining Long DRX cycle.

According to a fifth aspect provided in addition to any of the first to fourth aspects, in case the downlink control information is not received during the second time period, the receiver, when in operation, monitors the downlink channel for the channel occupancy signal during another first time period started when the next Long DRX cycle starts. Further, in case the downlink control information is received during the second time period, the receiver, when in operation, monitors the downlink channel for the channel occupancy signal during another first time period additionally started when the next one or more Short DRX cycle starts within the remaining Long DRX cycle.

According to a sixth aspect provided in addition to any of the first to fifth aspects, the first time period is shorter than an On-duration time of a Discontinued Reception, DRX, function operated at the user equipment. Optionally, the second time period has the same length as an On-duration time of a Discontinued Reception, DRX, function operated at the user equipment.

According to a seventh aspect provided in addition to any of the first to sixth aspects, the receiver, when in operation, further receives from the base station information about a channel occupancy time during which the base station is allowed to occupy the downlink channel. The receiver, when in operation, stops monitoring the downlink channel for the downlink control information during the second time period when the received channel occupancy time expires. Optionally, the information about the channel occupancy time is transmitted together with the channel occupancy signal from the base station.

According to an eighth aspect provided in addition to any of the first to seventh aspects, the receiver, when in operation, receives information on the time length of the first and/or second time period in one or more of the following:
- a system information broadcast,
- downlink control information,
- signaling of the Radio Resource Control protocol destined to the user equipment.

According to a ninth aspect provided in addition to any of the first to third aspects, the first time period starts every time when a synchronization block monitoring timing period starts. Optionally, the receiver, when in operation, stops monitoring the downlink channel for the downlink control information during the second time period when a received channel occupancy time, during which the base station is allowed to occupy the downlink channel, expires.

According to a tenth aspect provided in addition to the ninth aspect, the receiver, when in operation, receives additional information about periods within the second time period during which the user equipment is not required to monitor the downlink channel for the downlink control information. Optionally, the additional information is received from the base station together with the channel occupancy signal. Optionally, the additional information indicates uplink periods in a time-division-based communication during which no downlink communication from the base station is expected.

According to an eleventh aspect, a based station is provided that communicates with a user equipment via an unlicensed radio cell of a mobile communication system, wherein the base station comprising the following. A receiver and processing circuitry of the base station, when in operation, perform a clear channel assessment for a downlink channel of the unlicensed radio cell to determine whether the base station can occupy the downlink channel to perform downlink transmissions. A transmitter of the base station, when in operation and when the base station can occupy the downlink channel, transmits a channel occupancy signal on the downlink channel of the unlicensed radio cell to the user equipment. The channel occupancy signal indicates that the base station occupies the downlink channel to perform downlink transmissions. The transmitter, when in operation, transmits to the user equipment downlink control information regarding a downlink transmission to be received by the user equipment. The transmitter, when in operation, transmits a downlink transmission to the user equipment based on the received downlink control information.

According to a twelfth aspect in addition to the eleventh aspect, the processing circuitry, when in operation, determines whether the user equipment monitors, during a first time period, the downlink channel of the unlicensed radio cell for the channel occupancy signal that is transmitted by the base station. Optionally, the processing circuitry, when in operation, determines whether the user equipment monitors, during a second time period, the downlink channel of the unlicensed radio cell for downlink control information. Optionally, the transmitter transmits the downlink control information to the user equipment during the second time period when determining that the user equipment monitors during a second time period the downlink channel for the downlink control information.

According to a thirteenth aspect, a method is provided comprising the following steps performed by the user equipment. The UE monitors, during a first time period, a downlink channel of an unlicensed radio cell for a channel occupancy signal that is transmitted by a base station communicating with the user equipment via the unlicensed radio cell of a mobile communication system. The channel occupancy signal indicates that the base station occupies the downlink channel to perform downlink transmissions. The UE receives the channel occupancy signal during the first time period from the base station. The UE determines that the base station occupies the downlink channel based on the received channel occupancy signal. After determining that the base station occupies the downlink channel, the UE monitors, during a second time period, the downlink channel for downlink control information regarding a downlink transmission to be received by the user equipment. The UE receives the downlink control information during the second time period and receives subsequently the downlink transmission from the base station based on the received downlink control information.

According to a fourteenth aspect, a method is provided comprising the following steps performed by a base station. The UE performs a clear channel assessment for a downlink channel of the unlicensed radio cell to determine whether the base station can occupy the downlink channel to perform downlink transmissions. When the base station can occupy the downlink channel, the base station transmits a channel occupancy signal on the downlink channel of the unlicensed radio cell to the user equipment. The channel occupancy signal indicates that the base station occupies the downlink channel to perform downlink transmissions. The base station transmits to the user equipment downlink control information regarding a downlink transmission to be received by the user equipment. The base station transmits a downlink transmission to the user equipment based on the received downlink control information.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, comprising:
a receiver, which in operation, monitors, during a first time period, a downlink channel of an unlicensed radio cell for a channel occupancy signal that is transmitted by a base station communicating with the user equipment via the unlicensed radio cell of a mobile communication system, wherein the channel occupancy signal indicates that the base station occupies the downlink channel to perform downlink transmissions;
the receiver, which in operation, receives the channel occupancy signal during the first time period from the base station;
a processor, which in operation, determines that the base station occupies the downlink channel based on the received channel occupancy signal;
after determining that the base station occupies the downlink channel, the receiver, when in operation, monitors, during a second time period, the downlink channel for downlink control information regarding a downlink transmission to be received by the user equipment; and
the receiver, which in operation, receives the downlink control information during the second time period and receives subsequently the downlink transmission from the base station based on the received downlink control information.

2. The user equipment according to claim 1, wherein in case the channel occupancy signal is not received during the first time period, the user equipment is not required to monitor the downlink channel neither for the channel occupancy signal nor for the downlink control information during a sleep time period that starts at the expiry of the first time period, and
wherein in case the downlink control information is not received during the second time period, the user equipment is not required to monitor the downlink channel neither for the channel occupancy signal nor for the downlink control information during a sleep time period that starts at the expiry of the second time period.

3. The user equipment according to claim 1, wherein the channel occupancy signal is at least one of the following:
a reference signal broadcast by the base station in the unlicensed radio cell, wherein the reference signal is a demodulation reference signal; and
downlink control information transmitted in a common search space of the downlink channel, wherein the downlink control information is scrambled with a common UE identity such as the Slot Format Indicator Radio Network Temporary Identifier, SFI-RNTI, or the Interrupted Transmission Indicator RNTI, INT-RNTI or the System Information RNTI, SI-RNTI of a 5G-NR communication system.

4. The user equipment according to claim 1, wherein the first time period starts every time when a Long Discontinuous Reception, DRX, cycle starts, the Long DRX cycle being part of a DRX function operated at the user equipment,
   wherein in case the channel occupancy signal is not received during the first time period started when the Long DRX cycle starts, the receiver, when in operation, monitors the downlink channel for the channel occupancy signal during another first time period additionally started when the next one or more Short DRX cycle starts within the remaining Long DRX cycle, and
   wherein in case the channel occupancy signal is received during the first time period and the downlink control information is not received during the second time period, the receiver, when in operation, monitors the downlink channel for the downlink control information during another second time period additionally started when the next or more Short DRX cycle starts within the remaining Long DRX cycle.

5. The user equipment according to claim 1, wherein in case the downlink control information is not received during the second time period, the receiver, when in operation, monitors the downlink channel for the channel occupancy signal during another first time period started when the next Long DRX cycle starts, and
   in case the downlink control information is received during the second time period, the receiver, when in operation, monitors the downlink channel for the channel occupancy signal during another first time period additionally started when the next one or more Short DRX cycle starts within the remaining Long DRX cycle.

6. The user equipment according to claim 1, wherein the first time period is shorter than an On-duration time of a Discontinued Reception, DRX, function operated at the user equipment, and
   wherein the second time period has the same length as an On-duration time of a Discontinued Reception, DRX, function operated at the user equipment.

7. The user equipment according to claim 1, wherein the receiver, when in operation, further receives from the base station information about a channel occupancy time during which the base station is allowed to occupy the downlink channel,
   wherein the receiver, in operation, stops monitoring the downlink channel for the downlink control information during the second time period when the received channel occupancy time expires, and
   wherein the information about the channel occupancy time is transmitted together with the channel occupancy signal from the base station.

8. The user equipment according to claim 1, wherein the receiver, when in operation, receives information on the time length of the first and/or second time period in one or more of the following:
   a system information broadcast;
   downlink control information; and
   signaling of the Radio Resource Control protocol destined to the user equipment.

9. The user equipment according to claim 1, wherein the first time period starts every time when a synchronization block monitoring timing period starts, and
   wherein the receiver, when in operation, stops monitoring the downlink channel for the downlink control information during the second time period when a received channel occupancy time, during which the base station is allowed to occupy the downlink channel, expires.

10. The user equipment according to claim 9, wherein the receiver, when in operation, receives additional information about periods within the second time period during which the user equipment is not required to monitor the downlink channel for the downlink control information,
    wherein the additional information is received from the base station together with the channel occupancy signal, and
    wherein the additional information indicates uplink periods in a time-division-based communication during which no downlink communication from the base station is expected.

11. A base station, which in operation, communicates with a user equipment via an unlicensed radio cell of a mobile communication system, the base station comprising:
    a receiver and processing circuitry, which in operation, perform a clear channel assessment for a downlink channel of the unlicensed radio cell to determine whether the base station can occupy the downlink channel to perform downlink transmissions;
    a transmitter, which in operation and when the base station can occupy the downlink channel, transmits a channel occupancy signal on the downlink channel of the unlicensed radio cell to the user equipment, wherein the channel occupancy signal indicates that the base station occupies the downlink channel to perform downlink transmissions;
    the transmitter, which in operation, transmits to the user equipment downlink control information regarding a downlink transmission to be received by the user equipment; and
    the transmitter, which in operation, transmits a downlink transmission to the user equipment based on the received downlink control information,
    wherein the processing circuitry, when in operation, determines whether the user equipment monitors, during a first time period, the downlink channel of the unlicensed radio cell for the channel occupancy signal that is transmitted by the base station,
    wherein the processing circuitry, when in operation, determines whether the user equipment monitors, during a second time period, the downlink channel of the unlicensed radio cell for downlink control information, and
    wherein the transmitter transmits the downlink control information to the user equipment during the second time period when determining that the user equipment monitors during a second time period the downlink channel for the downlink control information.

12. A method comprising the following steps performed by a user equipment:
    monitoring, during a first time period, a downlink channel of an unlicensed radio cell for a channel occupancy signal that is transmitted by a base station communicating with the user equipment via the unlicensed radio cell of a mobile communication system, wherein the channel occupancy signal indicates that the base station occupies the downlink channel to perform downlink transmissions;

receiving the channel occupancy signal during the first time period from the base station;
determining that the base station occupies the downlink channel based on the received channel occupancy signal;
after determining that the base station occupies the downlink channel, monitoring, during a second time period, the downlink channel for downlink control information regarding a downlink transmission to be received by the user equipment; and
receiving the downlink control information during the second time period and receives subsequently the downlink transmission from the base station based on the received downlink control information.

* * * * *